(12) United States Patent
Yamamoto et al.

(10) Patent No.: US 8,818,163 B2
(45) Date of Patent: Aug. 26, 2014

(54) MOTION PICTURE PLAYING METHOD, MOTION PICTURE PLAYING APPARATUS AND RECORDING MEDIUM

(71) Applicant: Casio Computer Co., Ltd., Tokyo (JP)

(72) Inventors: Koji Yamamoto, Fussa (JP); Nobuhiro Aoki, Kokubunji (JP); Yoshiharu Houjou, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/845,421

(22) Filed: Mar. 18, 2013

(65) Prior Publication Data

US 2013/0251341 A1    Sep. 26, 2013

(30) Foreign Application Priority Data

Mar. 21, 2012    (JP) .................................. 2012-064053

(51) Int. Cl.
*H04N 9/80*        (2006.01)
*H04N 5/92*        (2006.01)
*H04N 7/10*        (2006.01)
*H04N 7/025*       (2006.01)

(52) U.S. Cl.
USPC ........... 386/239; 386/244; 386/245; 386/249; 725/33

(58) Field of Classification Search
USPC ...................... 386/239, 244, 245, 249; 725/33
See application file for complete search history.

(56) References Cited

U.S. PATENT DOCUMENTS

| 2003/0234819 A1* | 12/2003 | Daly et al. ..................... 345/810 |
| 2006/0020964 A1* | 1/2006 | Yun .................................. 725/33 |
| 2006/0079213 A1* | 4/2006 | Herberger et al. ......... 455/414.1 |
| 2010/0232713 A1* | 9/2010 | Zhou et al. ..................... 382/209 |

FOREIGN PATENT DOCUMENTS

| EP | 1603111 A1 * | 12/2005 | ............... G09G 5/34 |
| JP | 2003-219355 A | 7/2003 | |
| JP | 2005-099844 A | 4/2005 | |
| JP | 2007-059009 A | 3/2007 | |
| JP | 2008-305104 A | 12/2008 | |
| JP | 2010-243670 A | 10/2010 | |

OTHER PUBLICATIONS

Japanese Office Action dated Aug. 6, 2013 (and English translation thereof) in counterpart Japanese Application No. 2012-064053.

* cited by examiner

*Primary Examiner* — Daquan Zhao
(74) *Attorney, Agent, or Firm* — Holtz Holtz Goodman & Chick PC

(57) ABSTRACT

A motion picture playing method for playing a motion picture image on a display unit includes a motion picture image-obtaining step for obtaining the motion picture image, a character string-obtaining step for obtaining a character string scrolled and displayed in a predetermined direction overlaid on the motion picture image obtained in the motion picture image-obtaining step, and a control step for controlling a display mode for scrolling and displaying the character string based on (i) a length of the character string in the predetermined direction obtained in the character string-obtaining step, and (ii) a playing time of the motion picture image obtained in the motion picture image-obtaining step.

11 Claims, 9 Drawing Sheets

MOTION PICTURE PLAYING METHOD, MOTION PICTURE PLAYING APPARATUS AND RECORDING MEDIUM

BACKGROUND OF THE INVENTION

1. Field of the Invention

The present invention relates to a motion picture playing method, a motion picture playing apparatus, and a recording medium.

2. Description of the Related Art

A technique has been known for scrolling and displaying a character string such as any attached comment, like a sticky note, to a motion picture image when the motion picture image is played back (JP 2008-305104 A).

However, in the above JP 2008-305104 A, the character string attached to the motion picture image is scrolled and displayed with a constant speed regardless of, e.g., the playing mode of the motion picture image and the display mode of the character string itself. For this reason, the playing mode of the motion picture image and the display mode of the character string may be reproduced in such a manner that they are greatly different from each other to cause the viewer to feel uncomfortable.

BRIEF SUMMARY OF THE INVENTION

The present invention is made in view of such problems, and it is an object of the present invention to provide a motion picture playing method, a motion picture playing apparatus, and a recording medium capable of improving the harmony between the playing mode of the motion picture image and the display mode of the character string.

According to an embodiment of the present invention, there is provided a motion picture playing method for playing a motion picture image on a display unit which includes a step of obtaining a motion picture image; a step of obtaining a character string to be scrolled and displayed in a predetermined direction being overlaid on the motion picture image obtained in the motion picture image-obtaining step; and a step of controlling a display mode for scrolling and displaying the character string based on a length of the character string in the predetermined direction obtained in the character string-obtaining step and a playing time of the motion picture image obtained in the motion picture image-obtaining step.

According to an embodiment of the present invention, there is provided a motion picture playing apparatus for playing a motion picture image on a display unit which includes a motion picture image-obtaining unit for obtaining the motion picture image; a character string-obtaining unit for obtaining a character string to be scrolled and displayed in a predetermined direction being overlaid on the motion picture image obtained by the motion picture image-obtaining unit; and a control unit for controlling a display mode for scrolling and displaying the character string based on a length of the character string in the predetermined direction obtained by the character string-obtaining unit and a playing time of the motion picture image obtained by the motion picture image-obtaining unit.

According to an embodiment of the present invention, there is provided a recording medium storing a program for causing a computer for a motion picture playing apparatus for playing a motion picture image on a display unit to function as: a motion picture image-obtaining unit for obtaining the motion picture image; a character string-obtaining unit for obtaining a character string to be scrolled and displayed in a predetermined direction being overlaid on the motion picture image obtained by the motion picture image obtaining unit; and a control unit for controlling a display mode for scrolling and displaying the character string based on a length of the character string in the predetermined direction obtained by the character string-obtaining unit and a playing time of the motion picture image obtained by the motion picture image-obtaining unit.

DETAILED DESCRIPTION OF THE INVENTION

Hereinafter, a specific aspect of the present invention will be explained with reference to drawings. However, the scope of the invention is not limited to the example shown.

Figure 1:
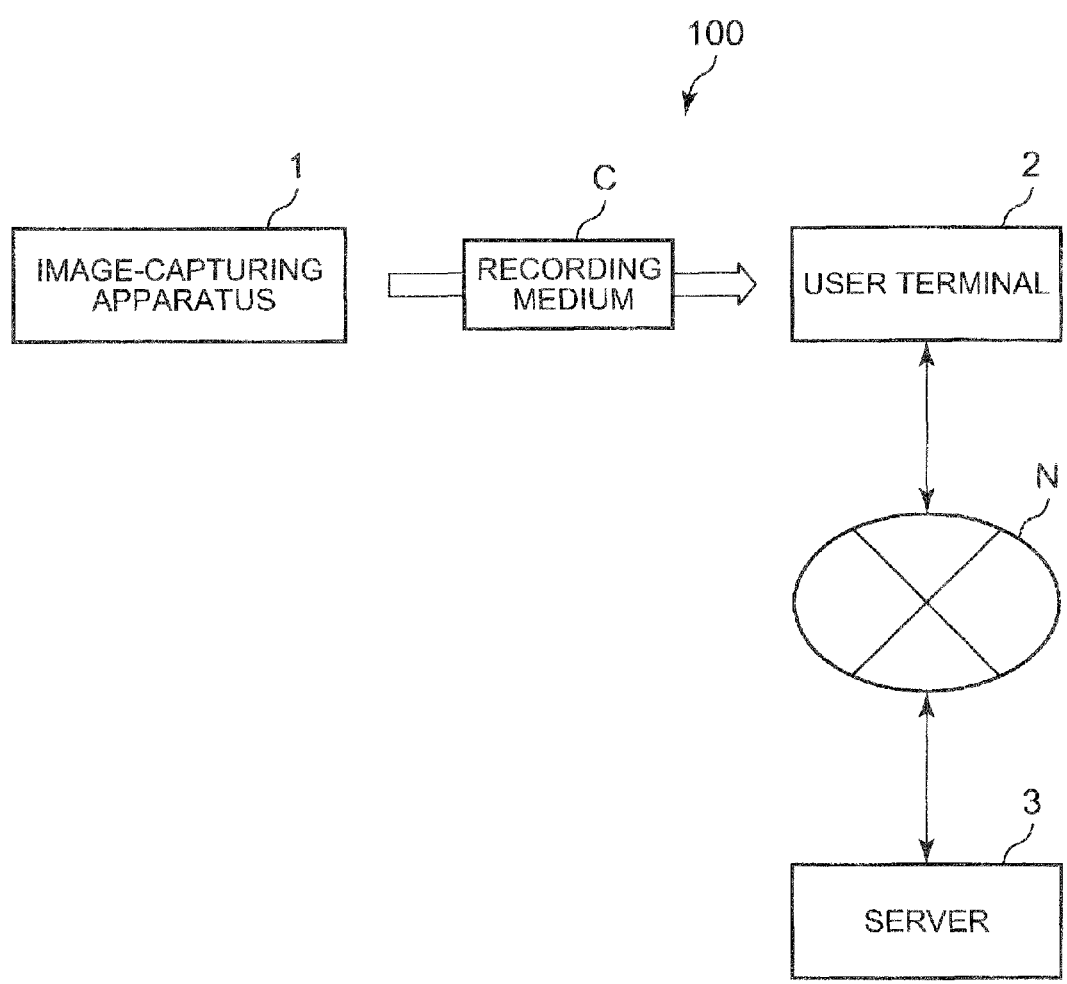
FIG. 1 is a block diagram illustrating a schematic configuration of a motion picture playing system according to an embodiment to which the present invention is applied.

FIG. 1 is a block diagram illustrating a schematic configuration of a motion picture playing system 100 according to an embodiment to which the present invention is applied.

As illustrated in FIG. 1, the motion picture playing system 100 according to the embodiment includes an image-capturing apparatus 1, a user terminal 2 and a server 3, and the user terminal 2 and the server 3 are connected via a predetermined communication network N in such a manner to be able to transmit and receive various kinds of information.

The image-capturing apparatus 1 has an image-capturing function for capturing an image of a subject, a recording function for recording image data of an image-capturing image to a recording medium C and the like. More specifically, the image-capturing apparatus 1 may be any known apparatus. For example, the image-capturing apparatus 1 may be not only a digital camera and the like of which primary function is image-capturing function but also, e.g., a cellular phone having image-capturing function which is not primary function of the cellular phone though.

Next, the user terminal 2 will be explained with reference to FIG. 2.

The user terminal 2 is constituted by, for example, a personal computer, and the user accesses a web page (for example, a page for motion picture playing) published by the server 3 to input various kinds of commands on the web page.

Figure 2:
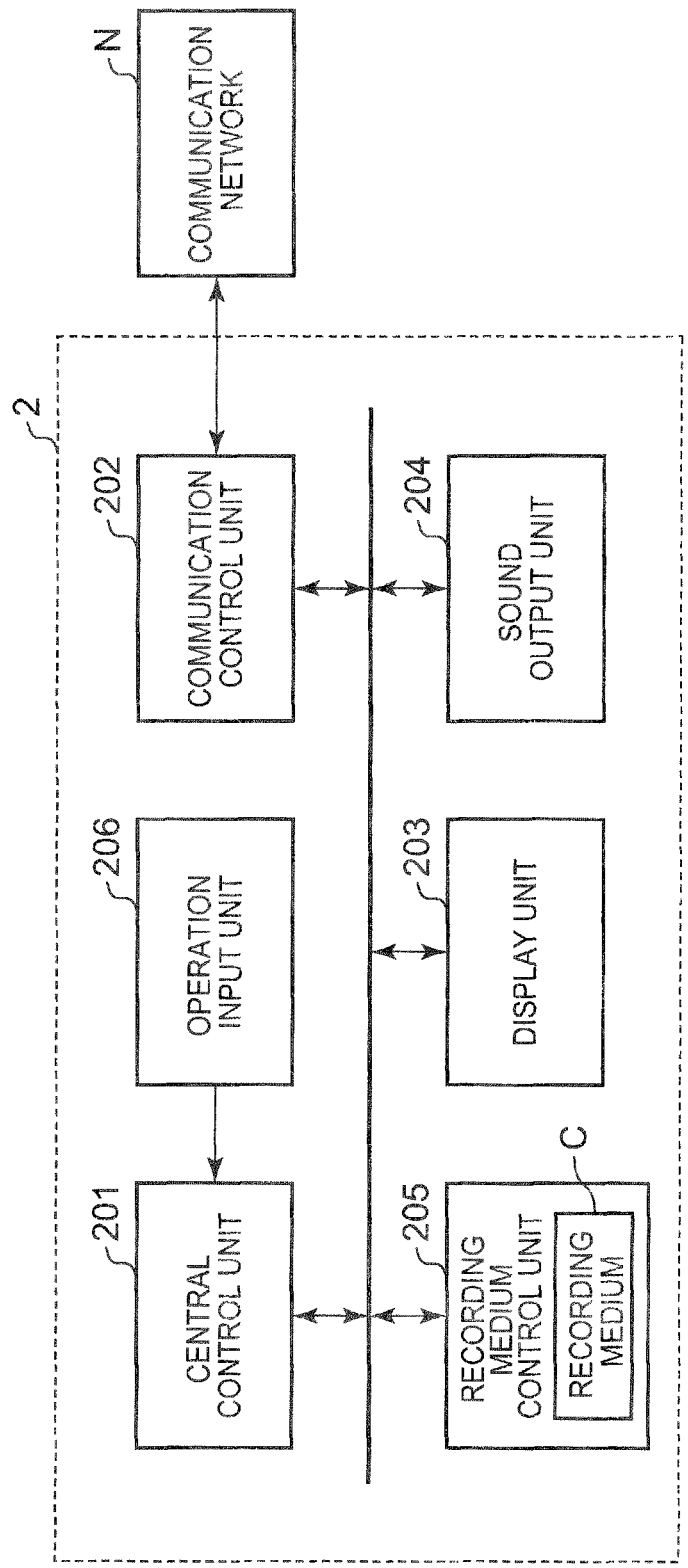
FIG. 2 is a block diagram illustrating a schematic configuration of a user terminal constituting the motion picture playing system.

FIG. 2 is a block diagram illustrating a schematic configuration of the user terminal 2.

As illustrated in FIG. 2, specifically, the user terminal 2 includes, for example, a central control unit 201, a communication control unit 202, a display unit 203, a sound output unit 204, a recording medium control unit 205, and an operation input unit 206.

The central control unit 201 controls each unit of the user terminal 2. Specifically, the central control unit 201 includes a CPU, a RAM, a ROM (all of which are not shown), and performs various kinds of control operation in accordance with various kinds of processing program (not shown) for the user terminal 2 stored in the ROM. At this occasion, the CPU stores various kinds of processing results to a storage region within the RAM, and as necessary the CPU displays the processing results on the display unit 203.

The RAM includes, for example, a program storage region where processing programs and the like executed by the CPU are extracted and a data storage region for storing, e.g. input data and processing result generated when the above processing program is executed.

The ROM stores a program stored in the form of a computer-readable program code. Specifically, the ROM stores, for example, a system program that can be executed by the user terminal 2, various kinds of processing programs that can be executed by the system program, and data that are used when the various kinds of processing programs are executed.

The communication control unit 202 is constituted by, for example a MODEM (Modulater/DEModulater) and a Terminal Adapter, and is to control communication of information to/from an external device such as the server 3 via a predetermined communication network N.

It should be noted that the communication network N is, for example, a communication network established using a private line or an existing public telephone line, and various forms of circuits such as a LAN (Local Area Network) and a WAN (Wide Area Network) may be applied. The communication network N includes, for example, a telephone network, an ISDN network, a private line, a mobile communication network, a communication satellite link, various kinds of communication networks such as CATV network, and Internet service providers for connecting them.

The display unit 203 is constituted by, for example, a display such as an LCD and a CRT (Cathode Ray Tube), and displays various kinds of information on a display screen under the control of the CPU of the central control unit 201.

More specifically, the display unit 203 displays, for example, a corresponding web page on the display screen, on the basis of page data of a web page (for example, a page for motion picture playing) which are transmitted from the server 3 and received by the communication control unit 202. Specifically, the display unit 203 displays various kinds of processing screens (not shown) and a comment-attached motion picture image K (see FIGS. 8A to 8D) on the display screen on the basis of image data of various kinds of processing screens related to the motion picture playing processing and motion picture data of the comment-attached motion picture image K related to the motion picture playing processing, which will be explained later.

The sound output unit 204 is constituted by, for example, a D/A converter, an LPF (Low Pass Filter), an amplifying device, and a speaker, and makes sound under the control of the CPU of the central control unit 201.

More specifically, the sound output unit 204, for example, converts digital data of performance (playback) information into analog data using the D/A converter and makes a music with predetermined timbre, pitch, tone length with the speaker via the amplifying device, on the basis of the performance information which is transmitted from the server 3 and received by the communication control unit 202. The sound output unit 204 may make a sound of a single sound source (for example, musical instrument), or may make sounds of a plurality of sound sources.

The recording medium control unit 205 controls writing and reading of data to/from a loaded recording medium C which is configured to be detachable. More specifically, the recording medium control unit 205 reads image data of a subject included image serving as a foreground image related to motion picture playing processing (explained later) from the record in medium C which is detached from the image-capturing apparatus 1 and loaded, and outputs the image data to the communication control unit 202. At this occasion, image data of a background image related to motion picture playing processing may be read from the recording medium C, and may be output to the communication control unit 202.

In this case, the subject-included image means an image which is used as a foreground image during generation of a motion picture image Q explained later and which includes a main subject in a predetermined background. The recording medium C is recorded with at least image data of a subject-included image encoded in accordance with a predetermined encoding format (for example, JPEG format) by an image processing unit (not shown) of the image-capturing apparatus 1.

Further, the communication control unit 202 transmits image data of the received subject-included image and, as necessary, image data of the background image to the server 3 via the predetermined communication network N.

The operation input unit 206 includes, for example, a mouse and a keyboard which is constituted by, e.g., data input keys for inputting numerical value, characters and the like, arrow keys for, e.g., selecting and moving data, and various kinds of function key, and outputs a press-down signal of a key pressed by a user and an operation signal of a mouse to the CPU of the central control unit 201.

Further, when a character string W such as a comment scrolled and displayed by being overlaid on a motion picture image Q, explained later, is to be added, the communication control unit 202 transmits character string data of the character string W which is input with the operation input unit 206 to the server 3 via the predetermined communication network N.

A touch panel (not shown) may be provided on the display screen of the display unit 203 as the operation input unit 206, so that various hinds of commands are input in accordance with the touch position of the touch panel.

Next, the server 3 will be explained with reference to FIG. 3.

The server 3 has a function as a web (World Wide Web) server for publishing a web page (for example, a page for motion picture playing) on the Internet, and transmits page data of a web page to the user terminal 2 in response to access from the user terminal 2. The server 3 serves as a motion picture playing apparatus to set a plurality of motion control points at positions corresponding to a plurality of movable points related to motion information M in a still image, and generate the motion picture image Q by moving a plurality of control points so as to follow the motion of the plurality of movable points of the specified motion information M. Further, the server 3 serves as the motion picture playing apparatus to obtain the motion picture image Q that can be played in a predetermined playing time and the character string W that is to be displayed and scrolled in a predetermined direction by being overlaid on the motion picture image Q, and play the comment-attached motion picture image K of which display mode for displaying and scrolling the character string W is controlled, on the basis of, for example, the length of the character string W in a predetermined direction and a playing time of the motion picture image Q. It should be noted that the motion picture image Q is not limited to an image generated by moving a plurality of control points that are set in accordance with a plurality of movable points related to the motion information M in the still image as described above. For example, alternatively, it may be, e.g., an image including a plurality of frame images made by combining a plurality of images (for example, foreground image and background image), an image already existing on a web page and the like on the Internet, and an existing image recorded in a recording medium C detachably attached to the recording medium control unit 205 of the user terminal 2.

Figure 3:
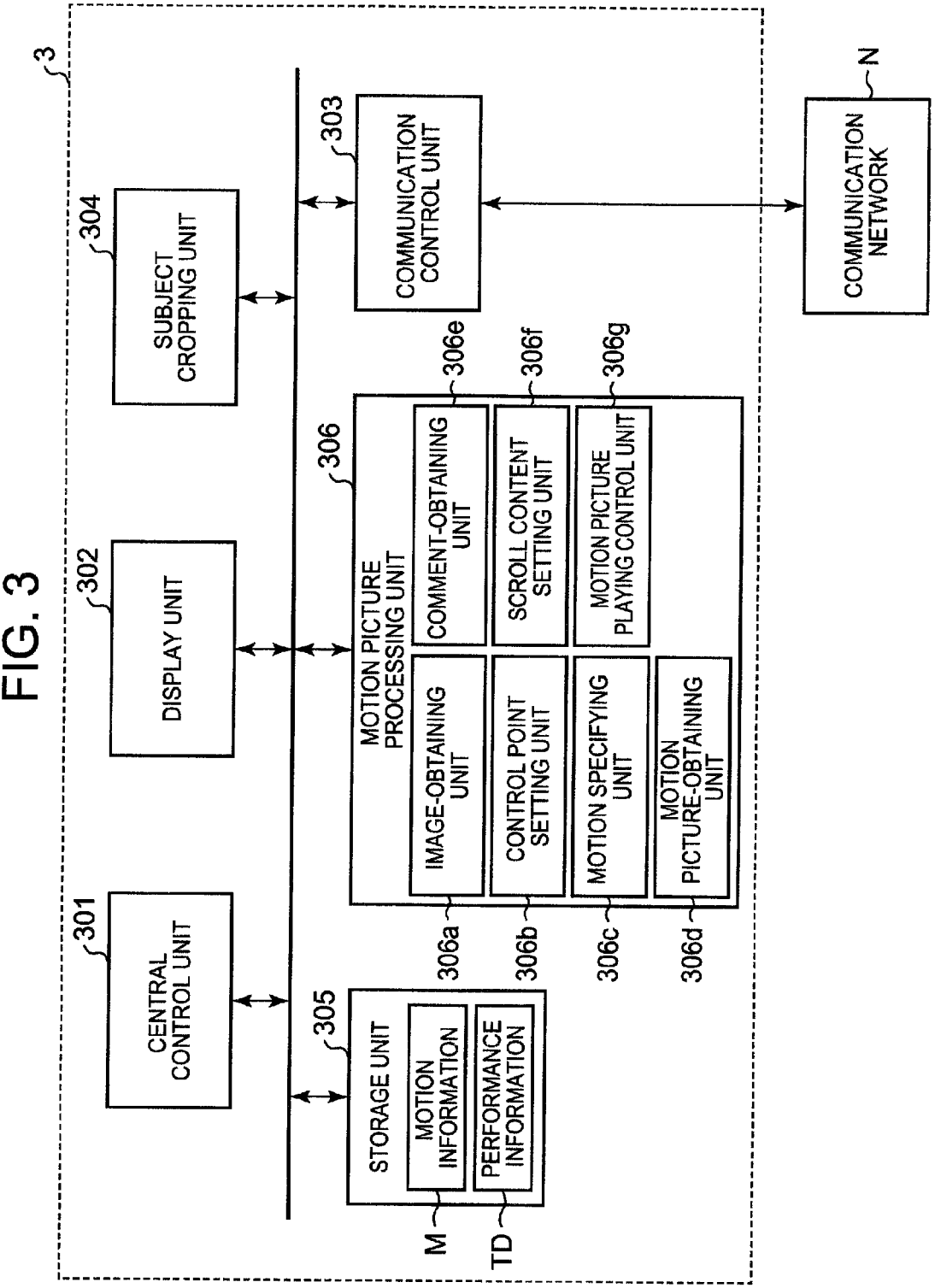
FIG. 3 is a block diagram illustrating a schematic configuration of a server constituting the motion picture playing system.

FIG. 3 is a block diagram illustrating a schematic configuration of the server 3.

As illustrated in FIG. 3, specifically, the server 3 is configured to include, for example, a central control unit 301, a display unit 302, a communication control unit 303, a subject cropping unit 304, a storage unit 305, and a motion picture processing unit 306.

The central control unit 301 controls each unit of the server 3. Specifically, the central control unit 301 includes a CPU, a RAM, a ROM (all of which are not shown), and the CPU performs various kinds of control operation in accordance with various kinds of processing program (not shown) for the server 3 stored in the ROM. At this occasion, the CPU stores various kinds of processing results to a storage region within the RAM, and as necessary displays the processing results on the display unit 302.

The RAM includes, for example, a program storage region where processing programs and the like executed by the CPU are extracted and a data storage region for storing, for example, input data and processing result generated when the above processing program is executed.

The ROM stores a program stored in the form of a computer-readable program code. Specifically, the ROM stores, for example, a system program that can be executed by the server 3, various kinds of processing programs that can be executed by the system program, and data that are used when the various kinds of processing programs are executed.

The display unit 302 is constituted by, for example, a display such as an LCD and a CRT, and displays various kinds of information such as the motion picture image Q (see FIGS. 7A to 7D) and the comment-attached motion picture image K (see FIGS. 8A to 8D), on a display screen under the control of the CPU of the central control unit 301.

Specifically, the display unit 302 displays, for example, the comment-attached motion picture image K, which is generated by overlaying a character string W (comment) including any given character, number, alphabet, symbol, and the like onto the motion picture image Q, on the display screen, on the basis of the image data of the comment-attached motion picture image K played by the motion picture playing processing (explained later).

The communication control unit 303 is constituted by, for example, a MODEM and a Terminal Adapter, and is to control communication of information to/from an external device such as the user terminal 2 via the predetermined communication network N.

Specifically, the communication control unit 303 receives, for example, the character string data of the character string W and the image data of the subject-included image transmitted via the predetermined communication network N from the user terminal 2 in the motion picture playing processing (explained later), and outputs the image data and the character string data to the CPU of the central control unit 301.

The CPU of the central control unit 301 outputs the received image data of the subject-included image to the subject cropping unit 304, and outputs the received character string data to the motion picture processing unit 306 (specifically, a comment-obtaining unit 306e explained later).

The subject cropping unit 304 generates a cropped image P1 of a subject G (see FIG. 6A) from the subject-included image (not shown).

More specifically, the subject cropping unit 304 uses a publicly known subject cropping method to generate an image P1 obtained by cropping a region including the subject G from the subject-included image. Specifically, the subject cropping unit 304 obtains, the image data of the subject-included image which are output from the CPU of the central control unit 301, and divides the subject-included image with a boarder line (not shown) drawn on the subject-included image displayed on the display unit 203 for example, on the basis of predetermined operation which is made by the user using the operation input unit 206 (for example, mouse) of the user terminal 2. Then, the subject cropping unit 304 extracts a subject region including the subject G which is divided with the boarder line of the subject-included image, and generates a cropped image data of the subject G in which the alpha value of the subject region is "1", the alpha value of the background portion of the subject G is "0", and the image of the subject region is combined with a predetermined single color image. More specifically, in the cropped image of the subject G, the transmission rate for the predetermined background in the subject region where the alpha value is "1" is 0%, and on the other hand, the transmission rate for the predetermined background in the background portion of the subject G where the alpha value is "0" is 100%.

For example, image data in an RGBA format can be applied as the cropped image data of the subject G, and more specifically, information about transmission rate A is added to each color defined by RGB color space. It should be noted that, for example, the cropped image data of the subject G may be configured to be associated with an alpha map in which, for each pixel of the subject-included image, weight for alpha-blending the image of the subject region with the predetermined background is represented as an alpha value ($0 \leq \alpha \leq 1$).

The subject cropping method with the subject cropping unit 304 explained above is merely an example, and is not limited thereto. Any method may be applied as long as it is a publicly known method for cropping a region including the subject G from the subject-included image.

The storage unit 305 is constituted by, for example, a semiconductor nonvolatile memory and an HDD (Hard Disc Drive), and stores, for example, page data of web pages and the subject-cropped image data of the subject G generated by the subject cropping unit 304, which are transmitted to the user terminal 2, and stores the motion picture data of the comment-attached motion picture image K in which the character string W to be displayed and scrolled in the predetermined direction is overlaid thereon, which is transmitted to the user terminal 2.

The storage unit 305 also stores a plurality of pieces of motion information M used for the motion picture playing processing.

Each piece of the motion information M is information indicating motion of a plurality of movable points (not shown) in a predetermined space, more specifically, for example, in a two-dimensional planar space which is defined by two axes (for example, x axis, y axis) perpendicular to each other and three-dimensional stereoscopic space defined by not only these two axes but also an axis (for example, z axis) perpendicular to the two axes. It should be noted that the motion information M may be information that can give depth to motion of a plurality of movable points by rotating the two-dimensional planar space about a predetermined rotation axis.

In this case, the position of each movable point is defined in view of, for example, the bone shape and the position of the joint of a motion model (for example, a person and an animal) serving as a model of movement, and, for example, can be set by defining the amount of movement of each movable point with respect to the movable pint serving as the reference. The number of movable points can be set as necessary in accordance with, for example, the shape and the size of the motion model.

The pieces of motion information M continuously represent the movement of the plurality of movable points by continuously arranging coordinate information obtained by moving all or at least one of the plurality of movable points in the predetermined space along a predetermined period of time axis with a predetermined period of time interval. Specifically, each piece of motion information M is, for example, information in which a plurality of movable points are moved to correspond to walking in a predetermined direction, and is stored in association with the model name of the motion model in which movement of the plurality of movable points are represented continuously. Each piece of motion information M is different in the continuous movement of the plurality of movable points in accordance with the type of motion (for example, raising hand, lowering hand, raising leg, lowering leg) and variations (for example, walking, running, skipping, jumping).

It should be noted that each piece of motion information M in which the above movable points are moved to correspond to walking in the predetermined direction is merely an example, and is not limited thereto. The type of motion and the like can be changed as necessary.

As described above, the storage unit 305 constitutes storage means for storing a plurality of pieces of motion information M representing movement of a plurality of movable points in the predetermined space in advance.

The storage unit 305 also stores a plurality of pieces of performance information TD used for the motion picture playing processing.

The performance information TD is information automatically played together with the motion picture image Q by the motion picture processing unit 306 (explained later) (for example, music information such as BGM (Background Music)). More specifically, for example, a plurality of pieces of performance information TD are defined in such a manner that, for example, tempo, rhythm, pitch, scale, tone, and reminding terms are different, and are stored in association with the music titles.

Each piece of performance information TD is digital data defined in accordance with, for example, MIDI (Musical Instruments Digital Interface) standard. Specifically, it includes header information for defining, for example, the number of tracks and the resolution of crotchet (the number of counts of Ticks) and track information for defining performance information TD for each of a plurality of sound sources (for example, musical instruments). The track information defines, for example, setting information about tempo and rhythm and timing of Note On/Off.

The motion picture processing unit 306 includes, for example, an image-obtaining unit 306a, a control point setting unit 306b, a motion specifying unit 306c, a motion picture-obtaining unit 306d, a comment-obtaining unit 306e, a scroll content setting unit 306f, and a motion picture playing control unit 306g.

The image-obtaining unit 306a obtains a still image used for the motion picture playing processing (explained later). In other words, the image-obtaining unit 306a obtains a background image P2 (see FIG. 6B) and a subject-cropped image. P1 (see FIG. 6A) serving as the foreground image constituting the still image used for the motion picture playing processing.

More specifically, the image-obtaining unit 306a obtains, as the foreground image desired by the user, the cropped image P1 of the subject G which is obtained by cropping the region including the subject G from the subject-included image including the subject G and the background, and obtains the background image P2 as the image desired by the user for composing the cropped image of the subject G.

Specifically, the image-obtaining unit 306a obtains the cropped image data of the subject G generated by the subject cropping unit 304, as the foreground image for constituting the still image which is to be processed. The image-obtaining unit 306a obtains, as the background image P2 desired by the user, the web pages on the Internet received via the communication network N by the communication control unit 303 and image data specified based on predetermined operation performed by the user with the operation input unit 206 from among at least one background image from the recording medium C of the user terminal 2.

The control point setting unit 306b sets a plurality of motion control points (not shown) within the still image to be processed.

More specifically, the control point setting unit 306b sets a plurality of motion control points at the positions corresponding to the plurality of movable points within the image of the subject G in the cropped image of the subject G obtained by the image-obtaining unit 306a. Specifically, the control point setting unit 306b reads the motion information M of the motion model (for example, person) from the storage unit 305, and specifies the positions corresponding to the plurality of movable points of the reference frame (for example the first frame) defining the motion information M within the image of the subject G in the cropped image of the subject G. For example, when the image of the subject G is an image obtained by cropping a persons as a main subject, the control point setting unit 306b specifies the position of each movable point in view of, for example, the bone shape and the position of the joint of the person. At this occasion, for the motion model and the image of the subject G, the size may be adjusted (for example, enlargement, reduction, deformation of the motion model) so as to be suitable for the main portion such as the face. For example, the positions corresponding to a plurality of movable points in the image of the subject G may be specified by overlaying the motion model and the image of the subject G.

Then, the control point setting unit 306b respectively sets the motion control points at the positions respectively corresponding to the specified plurality of movable points.

It should be noted that the motion control points may be set automatically as described above or may be set manually by the control point setting unit 306b. More specifically, for example, the motion control points may be set at desired positions which are input on the basis of the predetermined operation performed by the user with the operation input unit 206 of the user terminal 2.

Further, even when the motion control points are automatically set by the control point setting unit 306b, it may be possible to receive modification (change) of setting positions of the control points on the basis of the predetermined operation of the operation input unit 206 by the user.

The motion specifying unit 306c specifies the motion information M used for the motion picture playing processing.

More specifically, the motion specifying unit 306c specifies any one of pieces of motion information M from among a plurality of pieces of motion information M, . . . (and the like) stored in the storage unit 305. Specifically, when a command for specifying any one of model names (for example, walking) from among the model names of a plurality of motion models in a predetermined screen displayed on the display unit 203 on the basis of predetermined operation performed by the user with the operation input unit 206 of the user terminal 2 is input via the communication network N and the communication control unit 303, the motion specifying unit 306c specifies motion information M associated with the model name of the motion model related to the specifying command from among the plurality of pieces of motion information M, and the like.

It should be noted that, for example, the motion specifying unit 306c may automatically specify motion information M set as a default and motion information M specified by the user in the previous time from among the plurality of pieces of motion information M, and the like.

The motion picture-obtaining unit 306d serves as motion picture image obtaining means to obtain a motion picture image Q related to the motion picture playing processing.

Specifically, the motion picture-obtaining unit 306d obtains the motion picture image Q by generating motion picture images Q (see FIGS. 7A to 7D) including a plurality of frame images F1 to Fn which are made by combining a plurality of images.

More specifically the motion picture-obtaining unit 306d successively generates a plurality of foreground frame images (not shown) by moving a plurality of control points set in the image of the subject G of the subject-cropped image P1 so as to follow the motion of the plurality of movable points of the motion information M specified by the motion specifying unit 306c. For example, motion picture-obtaining unit 306d successively obtains coordinate information about the plurality of movable points moving with a predetermined period of time interval in accordance with the motion information M, and calculates the coordinates of the control points respectively corresponding to the movable points. Then, the motion picture-obtaining unit 306d successively moves the control points to the calculated coordinates, and generates foreground frame images by moving or deforming predetermined image regions (for example, regions in a shape of triangle or a rectangular mesh form) set in the image of the subject G with at least one of the control points as the reference.

Accordingly, for example, each of the foreground frame images is generated in which the control points are arranged at the positions corresponding to the coordinate information of the plurality of movable points of the motion information M.

It should be noted that the processing for making a plurality of foreground frame images as described above is a publicly known technique, and various kinds of methods can be widely applied. Therefore, detailed description thereabout is not given.

The generation of the foreground frame images by the motion picture-obtaining unit 306d is done with regard to, for example, information about each color and the transmission rate of the subject image defined by the alpha map or in the RGB color space.

The motion picture-obtaining unit 306d uses a publicly known image combining method to combine each of a plurality of foreground frame images generated and the background image P2 obtained by the image-obtaining unit 306a, and generate the motion picture image Q composed of the plurality of frame images F1 to Fn.

More specifically, for example, the motion picture-obtaining unit 306d passes a pixel in the background image P2 of which alpha value is "0", and overwrites a pixel thereon of which alpha value "1" with a pixel value of a corresponding pixel of each foreground frame image. Further, for a pixel in the background image P2 of which alpha value is "0<α1", an image (background image×(1−α)) generated by cropping a subject region of each foreground frame image is generated using a one's-complement number (1−α). Thereafter, a value blended with a single background color is calculated when the foreground frame image is generated using one's-complement number (1−α) in the alpha map, and this value is subtracted from the foreground frame image, whereby the image is combined with the image (background image×(1−α)) from which the subject region is cropped.

In this manner, the motion picture-obtaining unit 306d obtains the motion picture image Q which is reproduced by successively switching the plurality of frame images F1 to Fn at a predetermined playing frame rate (for example, 10 fps). More specifically, the motion picture-obtaining unit 306d obtains the motion picture image Q which can be reproduced in a predetermined playing time TQ.

The motion picture-obtaining unit 306d may be configured to generate an interpolation frame image (not shown) for interpolating two foreground frame images adjacent to each other along the time axis generated based on a plurality of control points respectively corresponding to the moved movable points. This processing for generating the interpolation frame image is a publicly known technique, and explanation thereabout is not given here.

The motion picture image Q may be made of foreground frame images generated by providing a plurality of movable points for the image of the subject G cropped by the subject cropping unit 304 and moving the plurality of control points that are set for the movable points.

The motion picture image Q may be recorded in the recording medium C of the user terminal 2. More specifically, when the motion picture image Q desired by the user is recorded in the recording medium C of the user terminal 2, the motion picture-obtaining unit 306d obtains, as the motion picture image Q desired by the user, motion picture image data specified based on predetermined operation performed by the user with the operation input unit 206, from the recording medium C of the user terminal 2 received by the communication control unit 303 via the communication network N.

Further, the motion picture image Q may be an image already existing in a web page and the like on the Internet. More specifically, when the motion picture image Q desired by the user is an image already existing in a web page and the like on the Internet, the motion picture-obtaining unit 306d obtains, as the motion picture image Q desired by the user, motion picture image data specified based on predetermined operation performed by the user with the operation input unit 206, from the web page on the Internet received, by the communication control unit 303 via the communication network N.

As described above, in the motion picture playing system 100 according to the embodiment, various motion picture images Q can be applied as the motion picture image Q, and therefore, the motion picture-obtaining unit 306d of the motion picture processing unit 306 of the server 3 may not necessarily have the function of generating the motion picture image Q.

The comment-obtaining unit 306e serves as character string obtaining means to obtain the character string W (see FIG. 8A and the like) related to the motion picture playing processing.

More specifically, the comment-obtaining unit 306e obtains any given character string W (comment) which is to be overlaid on the motion picture image Q constituting the comment-attached motion picture image K related to the motion picture playing processing.

Figure 8A:
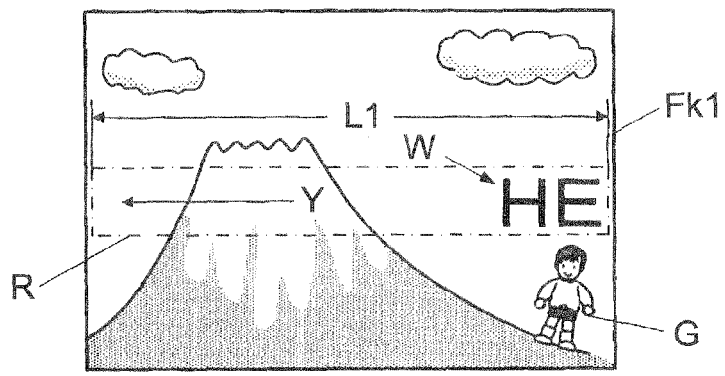
FIGS. 8A to 8D are figures for explaining the motion picture playing processing of FIG. 4.
Figure 8B:
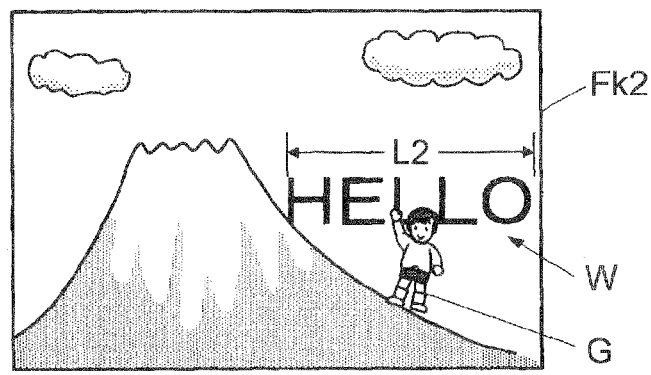

Specifically, the communication control unit 303 receives the character string data transmitted via the communication network N from the communication control unit 202 of the user terminal 2. More specifically, the communication control unit 303 receives any given character string data (characters, numbers, alphabets, symbols, and the like) input on the basis of predetermined operation performed by the user with the operation input unit 206. Accordingly, the comment-obtaining unit 306e obtains the character string W corresponding to the character string data (for example, "HELLO" as illustrated in FIG. 8B). At this occasion, the comment-obtaining unit 306e also obtains a length L2 of the obtained character string W in a predetermined direction. In this case, more specifically, the length L2 in the predetermined direction means the length (for example, the number of pixels) of the entire character string W in a direction in which the character string W is scrolled and displayed (scrolled and moved). In this case this means the length L2 in a direction of an arrow Y as illustrated in FIG. 8A (see FIG. 8B).

As described above, the character string W is not limited to the input via the communication network N from the user terminal 2 on the basis of the predetermined operation performed by the user with the operation input unit 206. For example, the user terminal 2 may store the predetermined character string W to the recording medium C and the like attached to the recording medium control unit 205 in advance, read the stored predetermined character string W as necessary, and transmit the predetermined character string W via the communication network N to the server 3. Alternatively, the predetermined character string W may be stored to a web page and the like on the Internet, and the stored predetermined character string W may be loaded as necessary, and the server 3 may obtain the predetermined character string W via the communication network N.

In this case, the predetermined character string W memorized or stored in advance means, for example, greeting such as "good morning", "hello", and "good afternoon", sentences expressing feelings such as "great!" and "surprised!", frequently used texts such as texts used among predetermined friends, and symbols imitating the face of a person (so-called, emoticon). As described above, by storing character strings W constituted by frequently used sentences and the like are stored as default, this can save the trouble of inputting them on every occasion and can improve the convenience of generating and obtaining the character string W.

The scroll content setting unit 306f serves as identifying means to identify a scroll display region R of the character string W related to the motion picture playing processing (see FIG. 8). More specifically, the scroll content setting unit 306f identifies the scroll display region R of the character string W scrolled and displayed in such a manner to be overlaid on the motion picture image Q in the display screen of the display unit 302.

Specifically, the scroll content setting unit 306f identifies the scroll display region R of the character string W scrolled and displayed in such a manner to be overlaid on the motion picture image Q in the display screen of the display unit 302. At this occasion, arrangement data for identifying an arrangement position and range including coordinate data and the like for identifying the scroll display region R are input from the user terminal 2 via the communication network N with predetermined operation performed by the user with the operation input unit 206. Then, the scroll content setting unit 306f identifies the scroll display region R for scrolling and displaying the character string W on the display screen of the display unit 302 (on the motion picture image Q) on the basis of the input arrangement data.

In this case, the scroll display region R is a region for scrolling and displaying the character string W on the display screen of the display unit 302, and is at least identified by a length (for example, the number of pixels) L1 in a predetermined direction (i.e., a longitudinal direction in which the character string W is scrolled and moved, which is a direction from the right side to the left side as illustrated by arrow Y in FIG. 8A). More specifically, the scroll display region R is identified by the position, the range (the size (length L1) in the longitudinal direction and the size in the width direction) on the motion picture image Q displayed on the display screen on the basis of the arrangement data which are input from the user terminal 2 via the communication network N.

The scroll content setting unit 306f also serves as setting means to set a scroll display direction Y (see FIG. 8A) of the character string W related to the motion picture playing processing. More specifically, the scroll content setting unit 306f sets the scroll display direction Y of the character string W (in FIG. 8A, direction Y indicated by an arrow) scrolled and displayed in such a manner to be overlaid on the motion picture image Q in the display screen of the display unit 302.

Specifically, the scroll content setting unit 306f sets the scroll display direction Y of the character string W scrolled and displayed in such a mariner to be overlaid on the motion picture image Q in the display screen of the display unit 302. At this occasion, the direction command data for setting the scroll display direction Y are input from the user terminal 2 via the communication network N by predetermined operation performed by the user with the operation input unit 206. Then, the scroll content setting unit 306f sets the scroll direction Y for scrolling and displaying the character string W on the display screen of the display unit 302 (on the motion picture image Q) on the basis of the input direction command data.

In this case, the direction in which the character string W is scrolled (scroll display direction) is defined as the direction Y which is from the right side to the left side in FIG. 8A as illustrated by the arrow, but this is merely an example and is not limited thereto. More specifically, the scroll display direction may be set in any direction. Various directions may be widely set, for example, a direction from the left side to the right, side of the display screen, the lower side to the upper side, the upper side to the lower side, a direction for rotating to the upper, lower, left, and right sides along the inner peripheral end portions of the display screen, a direction that is not in a single vertical or horizontal direction but is a reciprocal direction in the vertical or horizontal direction, a diagonal direction.

At this occasion, the character string W scrolled and displayed is not limited to one row in the scroll display direction. Alternatively, it may include a plurality of lines. For example when the scroll display direction of the character string W is set in the vertical direction of the display screen, it may be set to be in one row (vertically one row) in the vertical direction, or when it is in the state of one row (horizontally one row) in the horizontal direction perpendicular to the vertical direction, i.e., the character string W is "HELLO" (see FIG. 8B), it may be set in the state such that the character string W extends over five rows in the vertical direction.

Likewise, the position and the range for identifying the scroll display region R can be set in any position and range, and at any position of the display screen, the position and the range can be set as the entire or any partial range of the display screen in the vertical, horizontal, or diagonal direction thereof.

In addition, the character string W scrolled and displayed in such a manner to be overlaid on the motion picture image Q may be arranged in each of a plurality of foreground frame images over the plurality of frame images F1 to Fn constituting the motion picture image Q, or may be in the background image P2. When the character string W is arranged in each of a plurality of foreground frame images, the character string W is scrolled and displayed on the forefront of the foreground frame images in the display screen of the display unit 302. When the character string W is arranged on the background image P2, the character string W is scrolled and displayed between the foreground frame image and the background image P2 in the display screen of the display unit 302.

The scroll content setting unit 306*f* also serves as setting means to set a display number which is the number of times the character string W related to the motion picture playing processing is scrolled and displayed. This means that the scroll content setting unit 306*f* sets a scroll display number which is the number of times the character string W scrolled and displayed in such a manner to be overlaid on the motion picture image Q in the display screen of the display unit 302 is scrolled and displayed.

Specifically, the scroll content setting unit 306*f* sets the scroll display number which is the number of times the character string W scrolled and displayed while it is overlaid on the motion picture image Q in the display screen of the display unit 302 is scrolled and displayed. At this occasion, number-of-times-specifying data for setting the scroll display number, i.e., for setting the number of times F the character string W is repeatedly scrolled and displaced within a predetermined period of time (for example, a playing time of music (BGM) associated with the motion picture image Q and the playing time of the motion picture image Q) is input from the user terminal 2 via the communication network N by any operation performed by the user with the operation input unit 206. Then, the scroll content setting unit 306*f* sets the scroll display number which is the number of times the character string W is scrolled and displayed within the predetermined period of time on the display screen of the display unit 302 (on the motion picture image Q) on the basis of the input number-of-times-specifying data. It should be noted that the scroll display number can be set at any value in accordance with the number of times desired by the user.

The motion picture playing control unit 306*g* controls playing of the motion picture image Q by reproducing each of the plurality of frame images F1 to Fn constituting the motion picture image Q obtained by the motion picture-obtaining unit 306*d*.

More specifically, the motion picture playing control unit 306*g* performs control so as to automatically play predetermined music on the basis of the performance information TD specified based on predetermined operation performed by the user with the operation input unit 206 of the user terminal 2, and controls playback of the motion picture image Q by playing each of the plurality of frame images F1 to Fn with predetermined timing of the predetermined music. Specifically, the motion picture playing control unit 306*g* converts the digital data of the performance information TD of the predetermined music into analog data with the D/A converter to automatically play the predetermined music, and at this occasion, each of the plurality of frame images F1 to Fn is reproduced so as to be in synchronization with the predetermined timing (for example, the first beat of each measure and each bar). At this occasion, each interpolation frame image corresponding to the degree of progression may be reproduced in accordance with the relative degree of progression of playing (playback) of the predetermined music between two adjacent frame images (for example, F1 and F2).

The motion picture playing control unit 306*g* serves as control means to control the display mode for scrolling and displaying the character string W, on the basis of at least the length L2 of the character string W in the predetermined direction obtained by the comment-obtaining unit 306*e* related to the motion picture playing processing and the playing time TQ of the motion picture image Q obtained by the motion picture-obtaining unit 306*d*. More specifically, the motion picture playing control unit 306*g* controls the display mode of the character string W scrolled and displayed in such a manner to be overlaid on the motion picture image Q in association with the playing mode of the motion picture image Q (the playing (playback) time T of music such as BGM (Back ground Music) and the playing time TQ of the motion picture image Q) on the basis of the playing time TQ of the motion picture image Q and the length L2 of the entire character string W of the character string W in the predetermined direction in accordance with specification by predetermined operation performed by the user with the operation input unit 206 of the user terminal 2.

In this case, the display mode of the character string W means scrolling and displaying the character string W (display state) in association with the playing time TQ of the motion picture image Q and the playing time T of the BGM therefor.

More specifically, for example, it may be the display state (display method) for terminating the scrolling and the displaying of the character string W overlaid on the motion picture image Q in accordance with the playing time TQ of the motion picture image Q or the termination of the playing time T of the BGM.

At this occasion, for example, this includes display performance such as scrolling and displaying by changing the number of times the character string W is displayed in association with the playing time TQ of the motion picture image Q or the playing time T of the BGM.

Further, the display mode is not limited to the above specific examples, and in addition, for example, it may be a display mode for displaying by arbitrarily combining each of the display states and display performance.

Accordingly, the motion picture playing control unit 306*g* serves as the control means to be configured to be able to control each display mode of the character string W, on the basis of the length L1 of the scroll display region R specified by the scroll content setting unit 306*f* in the predetermined direction, the length L2 of the character string W in the predetermined direction, and the playing time TQ of the motion picture image Q on which the character string W is overlaid (added) or the playing time T of the BGM (music) associated with the playing of the motion picture image Q, in accordance with specification by predetermined operation performed by the user with the operation input unit 206 of the user terminal 2.

The motion picture playing control unit 306*g* is able to control, as the control means, the display mode of the character string W as described above, and in addition, the motion picture playing control unit 306g is able to control the display mode of the character string W on the basis of the display number F which is the number of times the character string W is scrolled and displayed which is set by the scroll content setting unit 306f.

Specifically, suppose that, in accordance with an instruction by predetermined operation performed by the user with the operation input unit 206 of the user terminal 2, for example, the user requested to terminate the scrolling and displaying of the character string W overlaid on the motion picture image Q in accordance with the termination of the playing time T of the BGM of the motion picture image Q. In this case, in response to the user's request, the motion picture playing control unit 306g uses, for example, the length L1 of the scroll region of the character string W, the length L2 of the character string W in the predetermined direction, the playing time T of the BGM of the motion picture image Q, and the display number F which is the number of times the character string W is repeatedly scrolled and displayed per one song of the BGM to calculate a scroll display speed S of the character string W on the basis of the following equation (1). Then, the scrolling and displaying of the character string W is controlled to attain the calculated scroll display speed S.

[Expression 1]

$$S = \frac{(L1 + L2) * F}{T} \qquad \text{equation (1)}$$

Therefore, for example, suppose that the length L1 of the scroll region R of the character string W is 400 (pixels), the length L2 of the character string W is 750 (pixels), the playing time T of the BGM is 16 (sec), and the display number F of the character string W is 1 (time). In this case, the scroll display speed S of the character string W is 71.875 (pixel/sec) by the equation (1).

In this case, the "pixel" is used for the unit of the length L2 of character string W and the length L1 of the scroll region R, but this is only an example, and is not limited thereto. Any unit such as "dot" can be widely applied as long as it is a unit representing a pixel. This can also be said to the playing time TQ of the motion picture image Q and the playing time T of the BGM.

As described above, in the server 3 according to the embodiment, the motion picture playing control unit 306g terminates the scrolling and displaying of the character string W overlaid on the motion picture image Q in accordance with the playing time TQ of the motion picture image Q and the termination of the playing time T of the BGM. More specifically, in accordance with the display mode of the character string W associated with the playing mode of the motion picture image Q which is desired by the user, the scroll display speed S of the character string W can be controlled.

It should be noted that the method for calculating the scroll display speed S of the character string W by the motion picture playing control unit 306g is merely an example, and is not limited thereto. It can be changed to any method as necessary. For example, in the above case, the scroll display mode of the character string W is associated with the playing time T of the BGM, but the scroll display mode of the character string W may be associated with the playing time TQ of the motion picture image Q. In this case, by replacing the playing time T of the BGM of the equation (1) with the playing time TQ of the motion picture image Q, the scroll display speed S of the character string W can be calculated in the same manner.

Next, the motion picture playing processing using the user terminal 2 and the server 3 will be explained with reference to FIGS. 4 to 8.

Figure 4:
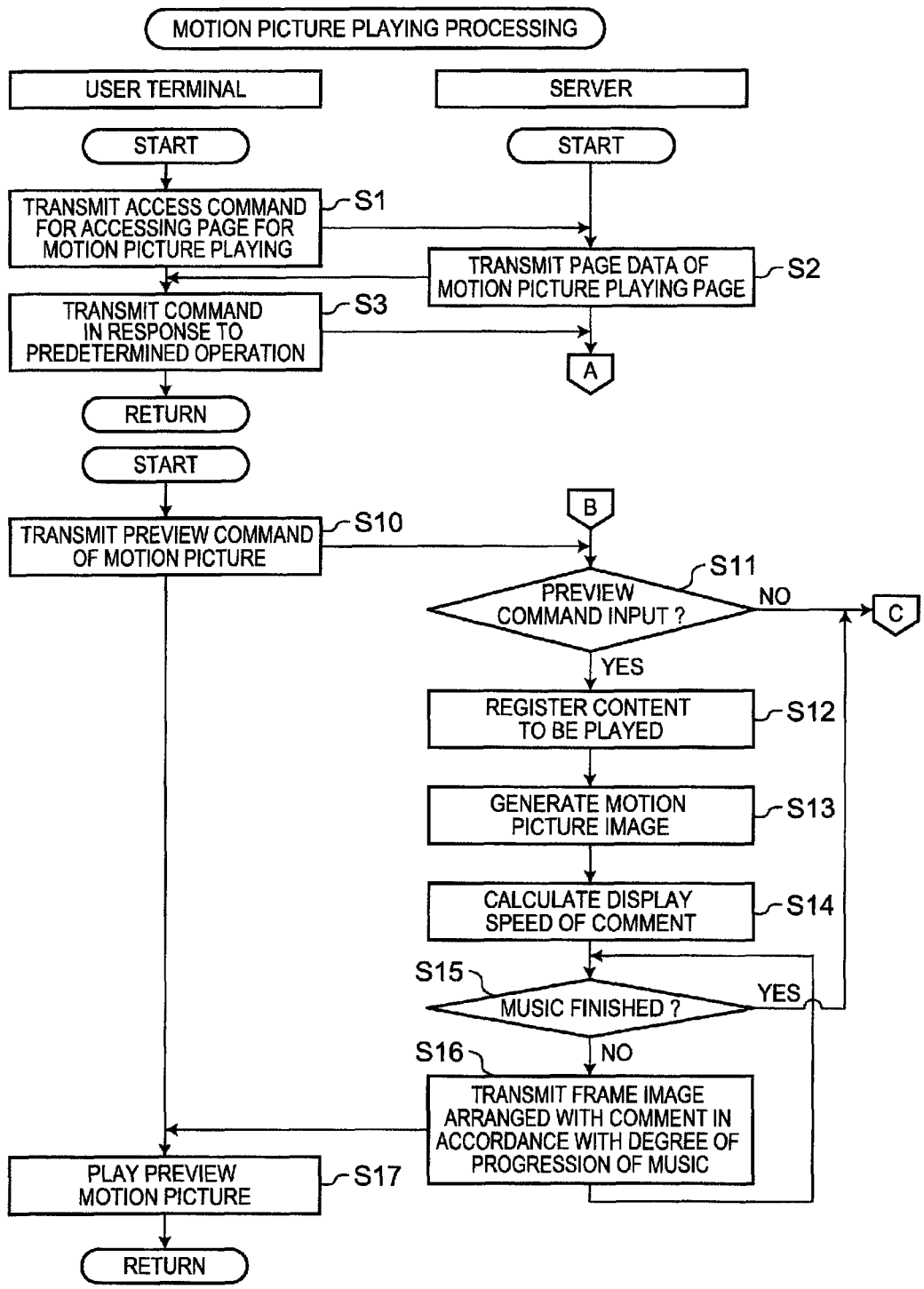
FIG. 4 is a flowchart illustrating an example of operation of motion picture playing processing by the motion picture playing system.
Figure 5:
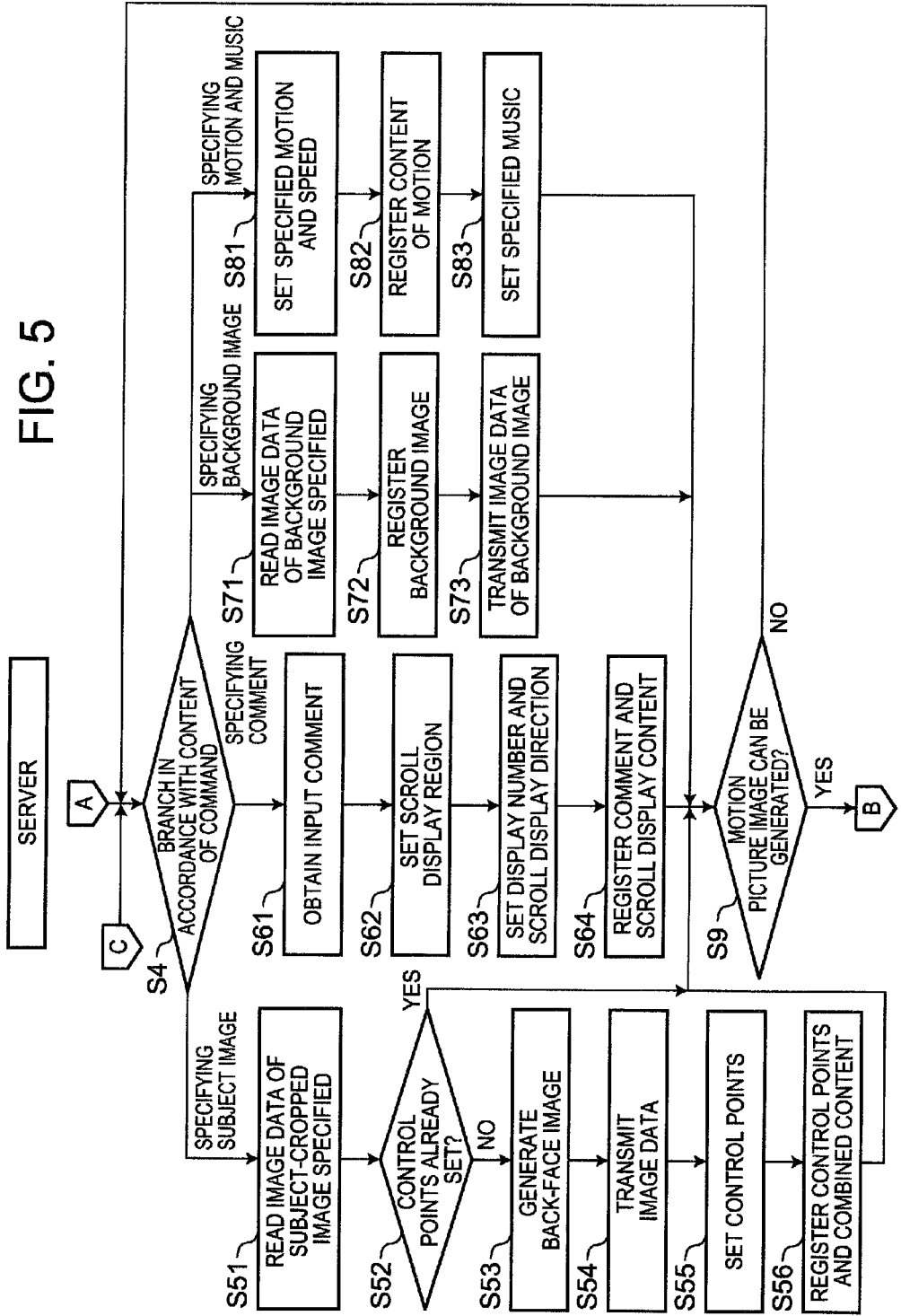
FIG. 5 is a flowchart illustrating a subsequent part of the motion picture playing processing of FIG. 4.
Figure 6A:
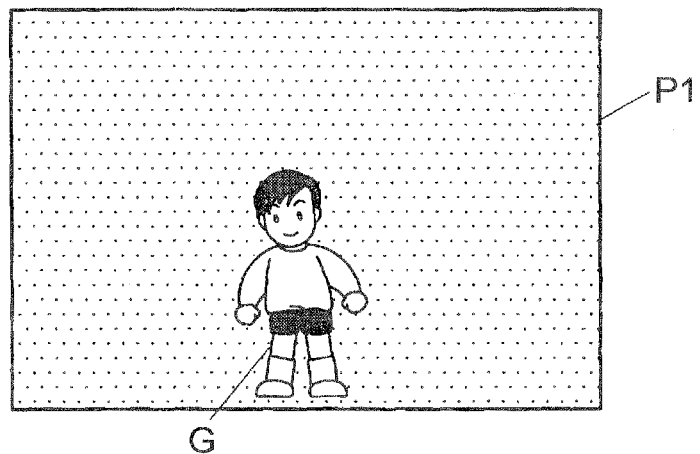
FIGS. 6A and 6B are figures schematically illustrating an example of an image related to the motion picture playing processing of FIG. 4.
Figure 6B:
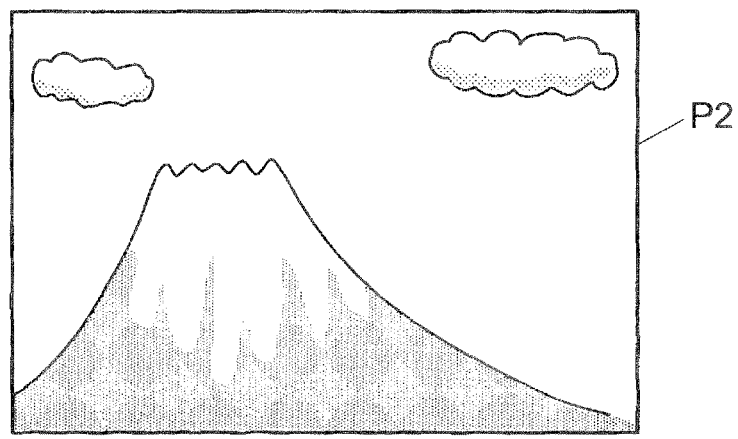
Figure 7A:
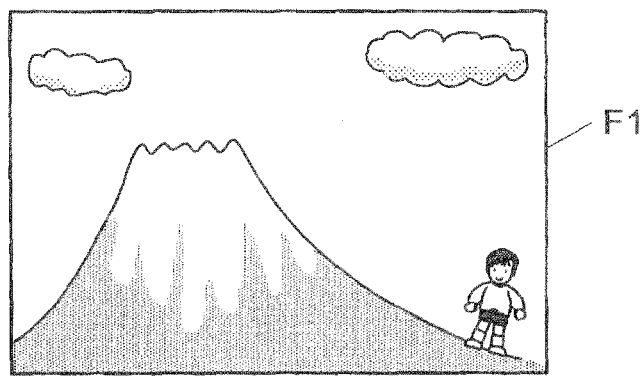
FIGS. 7A to 7D are figures for explaining the motion picture playing processing of FIG. 4.
Figure 7B:
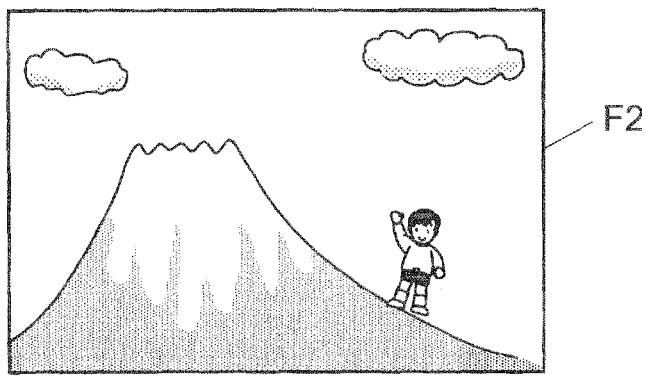
Figure 7C:
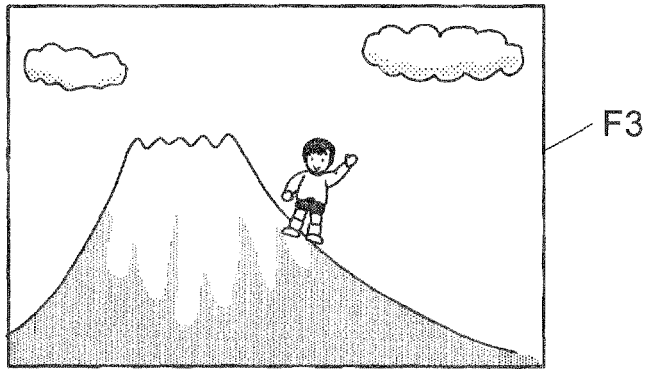
Figure 7D:
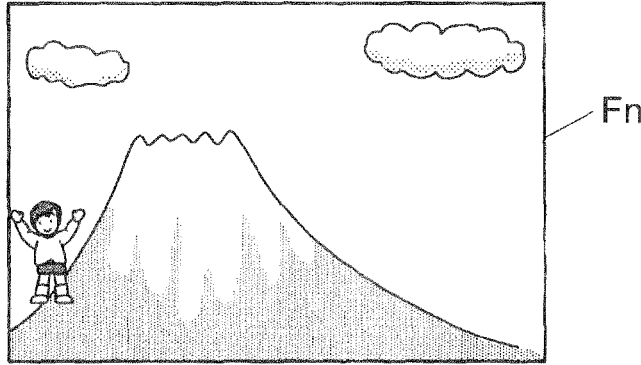
Figure 8C:
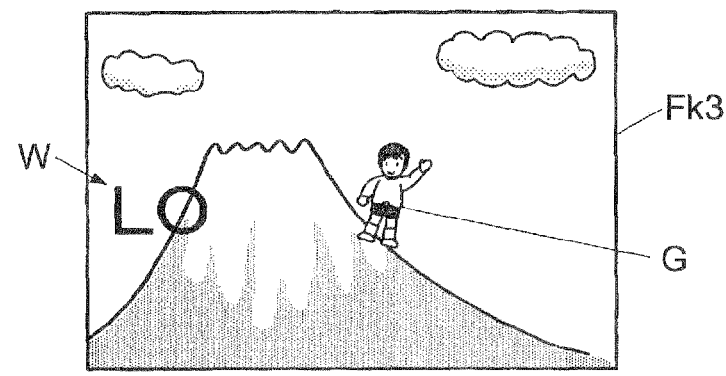
Figure 8D:
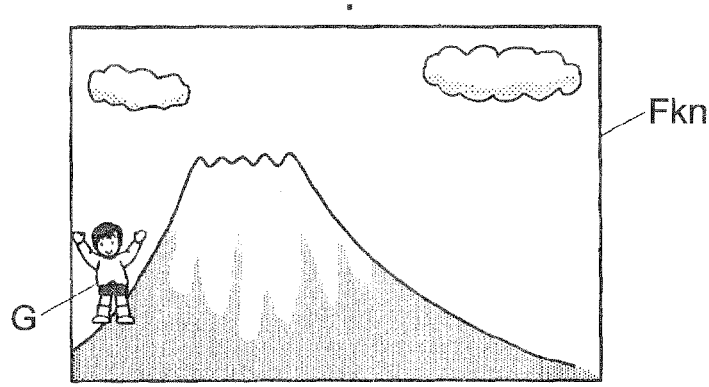

In this case FIGS. 4 and 5 are flowcharts illustrating an example of operation related to the motion picture playing processing. FIGS. 6A and 6B are figures schematically illustrating an example of an image related to the motion picture playing processing. FIGS. 7A to 7C are figures schematically illustrating an example of frame images F1 to Fn constituting the motion picture image Q related to the motion picture playing processing. FIGS. 8A to 8C are figures schematically illustrating an example of comment-attached motion picture image K displayed on the display unit 302 of the server 3 in the motion picture playing processing.

In the explanation below, image data of the background image P2 (see FIG. 6B) and the cropped image P1 of the subject G generated from the image data of the subject-included image (see FIG. 6A) are stored in the storage unit 305 of the server 3. In addition the motion information M in which a person is a motion model and the performance information TD of the BGM associated with the playing of the motion picture image Q are stored in the storage unit 305.

As illustrated in FIG. 4, an access command for accessing a page for motion picture playing published by the server 3 is input on the basis of predetermined operation performed by the user with the operation input unit 206. Then, the CPU of the central control unit 201 of the user terminal 2 transmits an access command via the predetermined communication network N to the server 3 using the communication control unit 202 (step S1).

When the communication control unit 303 of the server 3 receives the access command transmitted from the user terminal 2, the CPU of the central control unit 301 uses the communication control unit 303 to transmit page data of a page for motion picture playing via the predetermined communication network N to the user terminal 2 (step S2).

Then, when the communication control unit 202 of the user terminal 2 receives the page data of the page for motion picture playing, the display unit 203 displays a screen (not shown) of the page for motion picture playing on the basis of the page data of the page for motion picture playing.

Next, the central control unit 201 of the user terminal 2 uses the communication control unit 202 to transmit a command signal corresponding to various kinds of buttons operated on the screen of the page for motion picture playing, via the predetermined communication network N to the server 3, on the basis of predetermined operation performed by the user with the operation input unit 206 (step S3).

As illustrated in FIG. 5, the CPU of the central control unit 301 of the server 3 branches processing in accordance with the contents of the command provided by the user terminal 2 (step S4). Specifically, when the command from the user terminal 2 is the content for specifying the image of the subject G (step S4; specifying subject image), the CPU of the central control unit 301 subsequently performs processing in step S51. When the command from the user terminal 2 is a content for specifying the character string W (comment) (step S4; specifying comment), the CPU of the central control unit 301 subsequently performs processing in step S61. When the command from the user terminal 2 is a content for specifying the background image P2 (step S4; specifying background image), the CPU of the central control unit 301 subsequently performs processing in step S71. When the command from the user terminal 2 is a content for specifying motion and music (step S4; specifying motion and music), the CPU of the central control unit 301 subsequently performs processing in step S81.

<Specifying Subject Image>

When, in step S4, the command from the user terminal 2 is a content for specifying the image of the subject G (step S4 specifying subject image), the image-obtaining unit 306a of the motion picture processing unit 306 reads and obtains image data of the cropped image of the subject G specified by the user, from among the image data of the cropped images of the subject G stored in the storage unit 305 (step S51).

Next, the control point setting unit 306b determines whether the motion control point is already set or not in the subject image of the cropped image of the subject G thus obtained (step S52).

When, in step S52, it is determined that motion control points are not set (step S52; NO) the control point setting unit 306b sets a plurality of motion control points at positions corresponding to a plurality of movable points in the image of the subject G on the basis of the image data of the cropped image of the subject G, and performs predetermined trimming. Thereafter, the control point setting unit 306b generates a back-face image of the image of the subject G of the trimmed image (step S53).

Specifically, the control point setting unit 306b trims the cropped image of the subject G with a predetermined position of the image of the subject G (for example, center or the position of the face of the person) as the reference on the basis of the image data of the cropped image of the subject G, whereby correction is made so that the size of the image of the subject G and the size of the motion model (for example, person) becomes the same. This trimming is also done on the alpha map associated with the image data of the cropped image of the subject G.

Thereafter, the motion picture processing unit 306 performs back-face image generation processing for generating a back-face image (not shown) virtually representing the back-face which is the back side of the image of the subject G in the trimmed image (step S53).

Next, the CPU of the central control unit 301 uses the communication control unit 303 to transmit the image data of the cropped image of the subject G associated with the generated back-face image, via the predetermined communication network N to the user terminal 2 (step S54). Thereafter, the control point setting unit 306b sets a plurality of motion control points at the positions corresponding to the plurality of movable points within the image of the subject G in the cropped image of the subject G (step S55).

Specifically, the control point setting unit 306b reads the motion information M of the motion model (for example, person) from the storage unit 305, and specifies the positions respectively corresponding to the plurality of movable points in the reference frame (for example, the first frame) defined by the motion information M within the image of the subject G in the cropped image of the subject G. Thereafter, the control point setting unit 306b respectively sets the motion control points at the positions respectively corresponding to the plurality of movable points.

Then, motion picture-obtaining unit 306d registers the combined content such as the combined position and the size of the image of the subject G and the plurality of control points set for the image of the subject G, to predetermined storage means (for example, predetermined memory) (step S56).

Thereafter, the CPU of the central control unit 301 performs processing in step S9. The contents of the processing in step S9 will be explained later.

When, in step S52, it is determined that motion control points are already set (step S52; YES), the CPU of the central control unit 301 skips processing in steps S53 to S56, and subsequently performs processing in step S9.

<Specifying Comment>

When, in step S4, the command from the user terminal 2 is a content for specifying the character string W (comment) (step S4; specifying comment), the comment-obtaining unit 306e of the motion picture processing unit 306 obtains the character string W (comment) for overlaying on the motion picture image Q which is input on the basis of the predetermined operation performed by the user with the operation input unit 206 (step S61).

Specifically, any given character string data, for example, characters, numbers, alphabets, symbols, and the like, which are input on the basis of predetermined operation performed by the user with the operation input 206 are input via the communication network N and communication control unit 303. Then, the comment-obtaining unit 306e obtains the character string W corresponding to the character string data (for example, "HELLO" as illustrated in FIG. 8B) (step S61).

At this occasion, the comment-obtaining unit 306e also obtains a length L2 of the obtained character string W in a predetermined direction.

It should be noted that, the character string W is not limited to something that is input via the communication network N from the user terminal 2 on the basis of the predetermined operation performed by the user with the operation input unit 206. For example, the predetermined character string W stored to the recording medium C and the like attached to the recording medium control unit 205 of the user terminal 2 in advance may be read as necessary, and may be transmitted via the communication network N to the server 3. Alternatively, the predetermined character string W may be stored to a web page and the like on the Internet, and the stored predetermined character string W may be loaded as necessary on the basis of predetermined operation performed by the user with the operation input unit 206, and it may be transmitted via the communication network N to the server 3.

Next, the scroll content setting unit 306f of the motion picture processing unit 306 sets the scroll display region R of the character string W scrolled and displayed in such a manner to be overlaid on the motion picture image Q displayed on the display screen of the display unit 302 (see FIG. 8A) (step S62).

Specifically, arrangement data for identifying an arrangement position and range including coordinate data and the like for identifying the scroll display region R of the character string W are input from the user terminal 2 via the communication network N with predetermined operation performed by the user with the operation input unit 206. Then, the scroll content setting unit 306f sets the scroll display region R by identifying the scroll display region R for scrolling and displaying the character string W on the motion picture image Q displayed on the display screen of the display unit 302 on the basis of the input arrangement data.

At this occasion, the scroll display region R is identified by the position, the range (the size (length L1) in the longitudinal direction and the size in the width direction) on the motion picture image Q displayed on the display screen on the basis of the arrangement data which are input from the user terminal 2 via the communication network N. The position and the range for identifying the scroll display region R can be set to any position and range.

Next, the scroll content setting unit 306f sets the scroll display number which is the number of times the character string W is scrolled and displayed while it is overlaid on the motion picture image Q in the display unit 302, and the scroll display direction Y (see FIG. 8A) in which the character string W is scrolled and displayed (step S63).

Specifically, number-of-times-specifying data for setting the scroll display number F of the character string W are input via the communication network N from the user terminal 2 by predetermined operation performed by the user with the operation input unit 206. Then, the scroll content setting unit 306f sets the scroll display number which is the number of times the character string W is scrolled and displayed within the predetermined period of time on the display screen of the display unit 302 (on the motion picture image Q) on the basis of the input number-of-times-specifying data.

The direction command data for setting the scroll display direction Y of the character string W are input from the user terminal 2 via the communication network N by predetermined operation performed by the user with the operation input unit 206. Then, the scroll content setting unit 306f sets the scroll direction Y (for example, direction Y which is from the right side to the left side in FIG. 8A as illustrated by the arrow) for scrolling and displaying the character string W on the display screen of the display unit 302 (on the motion picture image Q) on the basis of the input direction command data.

Then, the scroll content setting unit 306f registers, to the predetermined storage means (for example, predetermined memory), the scroll display content such as the character string W scrolled and displayed, the scroll display region R of the character string W, the display number F scrolled and displayed, and the scroll display direction Y (step S64).

Thereafter, the CPU of the central control unit 301 performs processing in step S9. The contents of the processing in step S9 will be explained later.

<Specifying Background Image>

When, in step 4, the command from the user terminal 2 is a content for specifying the background image P2 (step S4; specifying background image), the motion picture-obtaining unit 306d of the motion picture processing unit 306 reads the image data of the desired background image (other image) P2 on the basis of predetermined operation performed by the user with the operation input unit 206 (step S71), and registers the image data of the background image P2 to the predetermined storage means as the background of the motion picture image (step S72).

Specifically, the server 3 receives, via the communication network N and the communication control unit 303, a specifying command of any one of image data specified on the basis of predetermined operation performed by the user with the operation input unit 206 from among a plurality of pieces of image data in the screen of the page for motion picture playing displayed on the display unit 203 of the user terminal 2. After the motion picture-obtaining unit 306d reads and obtains, from the storage unit 305, image data of the background image P2 (see FIG. 6B) related to the specifying command (step S71), the motion picture-obtaining unit 306d registers the image data of the background image P2 as the background of the motion picture image (step S72).

Next, the CPU of the central control unit 301 uses the communication control unit 303 to transmit the image data of the background image P2, via the predetermined communication network N to the user terminal 2 (step S73).

Thereafter, the CPU of the central control unit 301 performs processing in step S9. The contents of the processing in step S9 will be explained later.

<Specifying Motion and Music>

When, in step S4, the command from the user terminal 2 is a content for specifying motion and music (step S4; specifying motion and music), the motion picture processing unit 306 sets the motion information M and the speed of the motion on the basis of the predetermined operation performed by the user with the operation input unit 206 (step S81).

Specifically, the server 3 receives, via the communication network N and the communication control unit 303, a specifying command of any one of model names (for example, walking) specified on the basis of predetermined operation performed by the user with the operation input unit 206 from among a plurality of model names of a plurality of motion models in the screen of the page for motion picture playing displayed on the display unit 203 of the user terminal 2. The motion specifying unit 306c of the motion picture processing unit 306 sets the motion information M associated with the model name of the motion model related to the specifying command from among a plurality of pieces of motion information M stored in the storage unit 305. It should be noted that, for example, the motion picture processing unit 306 may automatically specify motion information M set as a default and motion information M specified by the user in the previous time from among the plurality of pieces of motion information M.

The server 3 receives, via the communication network N and the communication control unit 303, a specifying command of any one of speeds (for example, standard) specified on the basis of predetermined operation performed by the user with the operation input unit 206 from among a plurality of speeds of motions (for example, ½ speed, standard (same speed), double speed) in the screen of the page for motion picture playing displayed on the display unit 203 of the user terminal 2. The motion picture processing unit 306 sets the speed related to the specifying command as the speed of the motion of the subject image.

Thereafter, the motion picture playing control unit 306g of the motion picture processing unit 306 registers, to the predetermined storage means, the set motion information M as the content of motion of the motion picture image Q (step S82).

Next, the motion picture processing unit 306 sets music automatically played on the basis of predetermined operation performed by the user with the operation input unit 206 (step S83).

Specifically, the server 3 receives, via the communication network N and the communication control unit 303, a specifying command of any one of music titles specified on the basis of predetermined operation performed by the user with the operation input unit 206 from among a plurality of music titles in the screen of the page for motion picture playing displayed on the display unit 203 of the user terminal 2. The motion picture processing unit 306 sets the music of the music title related to the specifying command.

Thereafter, the CPU of the central control unit 301 performs processing in step S9. The contents of the processing in step S9 will be explained later.

In step S9, the CPU of the central control unit 301 determines whether it is in the state ready to generate the motion picture image Q (step S9). More specifically, on the basis of predetermined operation performed by the user with the operation input unit 206, the motion picture processing unit 306 of the server 3 determines whether or not it is ready to generate the motion picture image Q and can generate the motion picture image because the control points for the image of the subject G, the contents of motion of the image of the subject G, the background image P2 and the like are already registered.

Here, when it is determined that it is not in the state ready to generate the motion picture image Q (Step S9; NO), the CPU of the central control unit 301 goes back to processing in step S4, and branches processing in accordance with the content of the command given by the user terminal 2 (step S4).

On the other hand, when it is determined that it is in the state ready to generate the motion picture image Q (step S9; YES), the CPU of the central control unit 301 subsequently performs processing in step S11 as illustrated in FIG. 4.

In S11, the CPU of the central control unit 301 of the server 3 determines whether a preview command of the motion picture image is input or not on the basis of predetermined operation performed by the user with the operation input unit 206 of the user terminal 2 (step S11).

More specifically, in step S10, the central control unit 201 of the user terminal 2 uses the communication control unit 202 to transmit the preview command of the motion picture image which is input on the basis of the predetermined operation performed by the user with the operation input unit 206, via the predetermined communication network N to the server 3 (step S10).

Then, when, in step S11, the CPU of the central control unit 301 of the server 3 determines that the preview command of the motion picture image is input (step S11; YES), the motion picture playing control unit 306g of the motion picture processing unit 306 registers, to the predetermined storage means, the performance information TD corresponding to the music title having been set, as information automatically played together with the motion picture image Q (step S12).

Next, the motion picture processing unit 306 generates the motion picture image Q including the plurality of frame images F1 to Fn reproduced by successively switching them with the predetermined playing frame rate (for example, 10 fps) (step S13).

Specifically, the motion picture-obtaining unit 306d successively generates a plurality of foreground frame images by moving a plurality of control points set in the subject-cropped image P1 so as to follow the motion of the plurality of movable points of the motion information M specified. Then, the motion picture-obtaining unit 306d uses a publicly known image combining method to combine each of a plurality of foreground frame images generated and the background image P2, and generate the motion picture image Q composed of the plurality of frame images F1 to Fn.

Next, the motion picture playing control unit 306g calculates the display speed S of the character string W (comment) scrolled and displayed in such a manner to be overlaid on the motion picture image Q (step S14).

Specifically, the motion picture playing control unit 306g calculates the scroll display speed S of the character string W so as to terminate scrolling and displaying of the character string W overlaid on the motion picture image Q at the termination of the playing time T of the BGM of the motion picture image Q, more specifically, so that the character string W is scrolled and played on the motion picture image Q in accordance with the degree of progression of the playing of the music with the motion picture image Q. In other words, the motion picture playing control unit 306g calculates, on the basis of the equation (1) explained above, the scroll display speed S of the character string W from the length L1 of the scroll region of the character string W, the length L2 of the character string W in the scroll direction, the playing time T of the BGM of the motion picture image Q, and the display number F of the character string W.

Next, the motion picture processing unit 306 determines whether playing of the predetermined music based on the performance information TD with the motion picture playing control unit 306g has been finished (step S15).

The above processing is repeatedly executed until, in step S15, it is determined that the playing of the music has been finished (step S15; YES).

Then, when it is determined that the playing of the music has been finished (step 15; YES), the CPU of the central control unit 301 goes back to processing in stop S4, and branches processing in accordance with the content of the command given by the user terminal 2 as illustrated in FIG. 5 (step S4).

In this case, when it is determined that the playing of the music has not yet been finished (step S15; NO), the motion picture processing unit 306 subsequently performs processing in step S16.

Next, the CPU of the central control unit 301 uses the communication control unit 303 to transmit, in accordance with the degree of progression of playing of the music automatically played by the motion picture playing control unit 306g, preview motion picture including comment-attached frame images Fk1 to Fkn arranged with the character string W (comment), i.e., the motion picture data of the comment-attached motion picture image K, via the predetermined communication network N to the user terminal 2 (step S16).

More specifically, the motion picture playing control unit 306g successively generates, in accordance with the calculated scroll display speed S of the character string W, each of the comment-attached frame images Fk1 to Fkn in which the character string W scrolled and displayed in such a manner to be overlaid on the motion picture image Q is arranged at predetermined positions. The communication control unit 303 obtains each of the generated comment-attached frame images Fk1 to Fkn, and transmits the images via the predetermined communication network N to the user terminal 2.

As described above, the data of the preview motion picture are configured to include the motion picture image Q including the plurality of frame images F1 to Fn made by combining the user desired background image P2 and the predetermined number of foreground frame images and the character string W scrolled and displayed in the predetermined scroll display direction Y in such a manner to be overlaid on the predetermined scroll region R set arbitrarily on the motion picture image Q.

When, in step S16, the data of the preview motion picture transmitted from the server 3 are received by the communication control unit 303 of the user terminal 2, the CPU of the central control unit 201 reproduces the preview motion picture by controlling the sound output unit 204 and the display unit 203 (step S17).

Specifically, the sound output unit 204 plays the sound using the speaker by automatically playing the music based on the performance information TD, and the display unit 203 displays, on the display screen, the preview motion picture including the comment-attached frame images Fk1 to Fkn with predetermined timing of the music automatically played.

At this occasion, in the preview motion picture displayed on the display screen of the display unit 203, for example, the scrolling and displaying of the character string W scrolled and displayed in such a manner to be overlaid on the motion picture image Q are terminated when the playing of the BGM associated with the playing of the motion picture image Q is finished.

More specifically, the preview motion picture displayed on the display screen of the display unit 203 is the comment-attached motion picture image K composed of the comment-attached frame images Fk1, Fk2, Fk3, . . . Fkn as illustrated in FIGS. 8A to D obtained by adding the character string W, obtained by the comment-obtaining unit 306e and to be scrolled and displayed being overlaid on the motion picture image Q, to the plurality of frame images F1, F2, F3, ... Fn (see FIGS. 7A to D).

In the comment-attached motion picture image K, the character string W is arranged at predetermined position of each of the frame images F1, F2, F3, ... Fn, on the basis of the scroll region R, the scroll display direction Y, and the scroll display number F set by the scroll content setting unit 306f and in accordance with the degree of progression of the playing of the predetermined music played by the motion picture playing control unit 306g.

As described above, when the motion picture playing control unit 306g reproduces the motion picture image Q, the comment-attached motion picture image K is in the display mode such that the scrolling and displaying of the character string W overlaid on the motion picture image Q are terminated when the playing time T of the GM of the motion picture image Q is finished.

It should be noted that explained here is the case where the comment-attached motion picture image K is in the display mode such that the scrolling and displaying of the character string W overlaid on the motion picture image Q are terminated when the playing time T of the BGM for the image Q is finished. However, this is merely an example, and is not limited thereto, for example, the comment-attached motion picture image K may be generated in such a display mode that the scrolling and displaying of the character string W overlaid on the motion picture image Q are terminated when the playing time TQ of the motion picture image Q is finished.

As described above, according to the motion picture playing system 100 according to the embodiment, the server 3 is the motion picture playing apparatus, and the motion picture processing unit 306 includes the motion picture playing control unit 306g for controlling the display mode for scrolling and displaying the character string W on the basis of the length L2 of the character string W in the predetermined direction obtained by the comment-obtaining unit 306e and the playing time TQ of the motion picture image Q obtained by the motion picture-obtaining unit 306d. Accordingly, the motion picture playing control unit 306g can control the display mode for scrolling and displaying the character string W on the basis of at east the length L2, in the predetermined direction of the character string W related to the motion picture playing processing and the playing time TQ of the motion picture image Q. More specifically, the motion picture playing control unit 306g can control the display mode of the character string W scrolled and displayed in such a manner to be overlaid on the motion picture image Q so as to be associated with the playing mode of the motion picture image Q on the basis of the length L2 of the entire character string W and the playing time TQ of the motion picture image Q.

Therefore, this prevents the playing mode of the motion picture image Q and the display mode of the character string W from being greatly different from each other, and can improve the harmony between the playing mode of the motion picture image Q and the display mode of the character string W.

The scroll content setting unit 306f identifies the scroll display region R for scrolling and displaying the character string W in the display screen of the display unit 302. Accordingly, the motion picture playing control unit 306g can control the display mode of the character string W on the basis of the scroll content setting unit 306f, the length L2 of the character string W in the predetermined direction, and the playing time TQ of the motion picture image Q. More specifically, the scroll display region R for scrolling and displaying the character string W can be set at any region desired by the user, and even in this case, the display mode of the character string W can be controlled so that it is scrolled and displayed in the scroll display region R in association with the playing mode of the motion picture image Q.

Since the scroll content setting unit 306f sets the display number F which is the number of times the character string W is scrolled and displayed, the motion picture playing control unit 306g can control the display mode of the character string W on the basis of the display number F set by the scroll content setting unit 306f. More specifically, the motion picture processing unit 306 can scroll and display the character string W upon changing the number of times the character string W is scrolled and displayed, on the basis of the display number F which is set as necessary in association with the playing time TQ of the motion picture image Q and the playing time T of the BGM thereof.

More specifically, the number of times the character string W is scrolled and displayed can be set at any number of times desired by the user, and even in this case, the display mode of the character string W can be controlled so that it is scrolled and displayed for any number of times associated with the playing mode of the motion picture image Q.

In addition, the motion picture playing control unit 306g can control the scroll display speed S of the character string W in accordance with, for example, the display mode in which the scrolling and displaying of the character string W overlaid on the motion picture image Q is terminated when the playing time TQ of the motion picture image Q is finished.

In addition, the motion picture playing control unit 306g can control the scroll display speed S of the character string W in accordance with, for example, the display mode in which the scrolling and displaying of the character string W overlaid on the motion picture image Q is terminated at the time of finish of the playing time T of the BGM (music) played in association with the playing of the motion picture image Q.

At this occasion, the motion picture image Q may include a plurality of frame images F1 to F made by combining a plurality of foreground frame images and the background image P2.

As described above, in the conventional motion picture playing system, the character string is scrolled and displayed at only a constant speed regardless of the playing mode of the motion picture image Q and the display mode of the character string W, and therefore, the following problems occur. More specifically, in the past, the character string W is scrolled and displayed at only a constant speed, and therefore, there are problems in that it is difficult to control the scrolling and displaying of the character string W in association with the playing mode of the motion picture image Q and this results in playing in which the playing mode of the motion picture image Q and the display mode of the character string W are greatly different which causes the user to feel uncomfortable.

Therefore, in the past, it is difficult to perform the work for generation of the motion picture image Q (comment-attached motion picture image K) overlaid with the character string W in the display mode associated with the playing mode of the motion picture image Q in such a manner that the scrolling and displaying of the character string W is terminated in accordance with the playing time TQ of the motion picture image Q and the playing time T of the BGM thereof, and moreover, there is a problem in that it is difficult to reproduce the display mode desired by the user.

In contrast, the motion picture playing system 100 according to the embodiment employs the above configuration, which enables control of the display mode of the character string W scrolled and displayed in such a manner to be overlaid on the motion picture image Q in association with the playing mode of the motion picture image Q, whereby the problems associated with the systems in the past can be solved.

Therefore, according to the motion picture playing system 100 according to the embodiment, the motion picture playing control unit 306g can control each display mode of the character string W, on the basis of the length L1 of the scroll display region R specified by the scroll content setting unit 306f in the predetermined direction, the length L2 of the character string W in the predetermined direction, the playing time TQ of the motion picture image Q on which the character string W is overlaid (added), or the playing time T of the BGM (music) associated with the playing of the motion picture image Q, in accordance with specification by predetermined operation performed by the user with the operation input unit 206 of the user terminal 2.

Thus, the motion picture playing system 100 according to the embodiment can improve the harmony between the playing mode of the motion picture image Q and the display mode of the character string W.

It should be noted that the present invention is not limited to the above embodiment, and various improvements and changes of designs can be made without deviating from the gist of the present invention.

For example, in the embodiment, the scroll display speed S of the character string W is controlled so as to terminate the scrolling and displaying of the character string W overlaid on the motion picture image Q in accordance with the playing time TQ of the motion picture image Q or at the time of finish of the playing time T of the BGM (music) played in association with the playing of the motion picture image Q, but this is merely an example, and is not limited thereto. The control of the display mode of the character string W can be changed as necessary.

Hereinafter, a modification of the server 3 of the motion picture playing system 100 will be explained with reference to FIG. 9.

Figure 9:
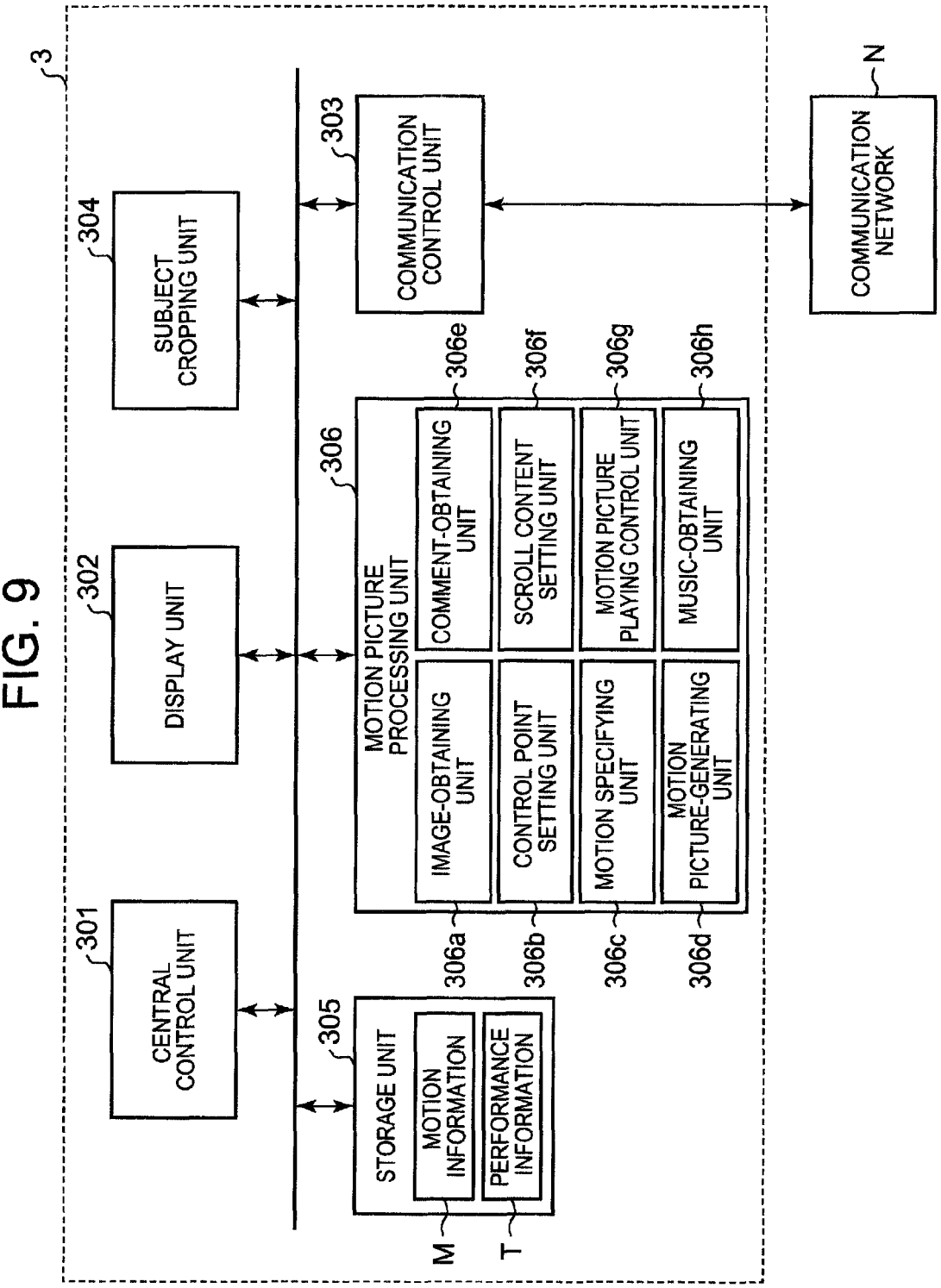
FIG. 9 is a block diagram illustrating a schematic configuration of a server constituting the motion picture playing system according to another embodiment to which the present invention is applied.

For example, the server 3 of the motion picture playing system 100 may be configured such that the motion picture processing unit 306 further includes a music-obtaining unit 306h as illustrated in FIG. 9, in which the same portions as those of FIG. 3 are denoted with the same reference numerals.

In this case, the music-obtaining unit 306h serves as music obtaining means to obtain a tempo b of the BGM included in the performance information TD related to the BGM (music) played in association with the playing of the motion picture image Q. On the basis of the tempo b of the BGM thus obtained, the scroll display speed S of the character string W in the motion picture image Q may be controlled.

More specifically, the motion picture playing control unit 306g of the motion picture processing unit 306 controls the display mode of the character string W on the basis of the tempo b of the music included in the performance information TD obtained by the music-obtaining unit 306h.

More specifically, for example, when there is change in the tempo b of the BGM for the motion picture image Q, i.e., the BGM is different in the tempo b for every predetermined number n of sections k (predetermined bars), the music-obtaining unit 306h obtains tempo information about the tempo b of the BGM, on the basis of the performance information TD of the BGM stored in the storage unit 305. Then, the motion picture playing control unit 306g controls the display mode of the character string W so as to change the speed of the scrolling and displaying of the character string W in accordance with (in association with) different tempo b of the BGM on the basis of the tempo information obtained by the music-obtaining unit 306h.

Therefore, the motion picture playing control unit 306g serves as control means to control the display mode of the character string W explained above and in addition, control the display mode of the character string W on the bass of the tempo b of the music included in the performance information TD about the BGM (music) obtained by the music-obtaining unit 306h.

For example, when the tempo b of the BGM changes on every predetermined number n of sections k, the speed of the scrolling and displaying of the character string W may be changed in association with the section tempos b1 to bk of the BGM. In this case, using, for example, the length L1 of the scroll region of the character string W, the length L2 of the character string W in the predetermined direction, a playing time Tk of the BGM in the k-th section, the tempo bk of the BGM in the k-th section, and display number F which is the number of times the character string W is repeatedly scrolled and displayed for each song of the BGM, the scroll display speed S1 of the character string W1 in the first section (section speed) is calculated on the basis of the following equation (2), and the scroll display speed Sk of the character string W in the k-th section (section speed) is calculated on the basis of the following equation (3). However, in the following equation (2), the predetermined number n does not include 1 (n>1), and integer value, not including 1, up to the predetermined number n is successively substituted into k indicating the section number.

[Expression 2]

$$S_1 = \frac{b_1(L_1 + L_2)}{\sum_{i=1}^{n} T_i b_i} \quad \text{equation (2)}$$

[Expression 3]

$$S_k = \frac{b_k S_1}{b_1} \quad \text{equation (3)}$$

Therefore, for example, there are two sections k, the length L1 of the scroll region of the character string W is 400 (pixels), the length L2 of character string W is 750 (pixels), the playing time T1 of the BGM in the first section is 16 (sec), the playing time T2 of the BGM in the second section is 12 (sec) the tempo b1 of the BGM in the first section is 120 (beat/min) the playing time T2 of the BGM in the second section is 149 (beat/min), and the display number F of the character string W is once (one time). In this case, the scroll display speed S1 of the character string W in the first section (k=1) is 37.22 (pixel/sec) in accordance with the equation (2), and the scroll display speed S2 of the character string W in the second section (k=2) is 46.21 (pixel/sec) in accordance with the equation (3).

As described above, in the server 3 as illustrated in FIG. 9, the motion picture playing control unit 306g can change the speed of the scrolling and displaying of the character string W overlaid on the motion picture image Q in accordance with (in association with) each tempo b of the BGM each of which has different tempo b in each of the predetermined sections (bars), on the basis of the tempo information obtained by the music-obtaining unit 306h.

More specifically, the music played in association with the playing of the motion picture image is set as any music desired by the user. For this reason, even when a plurality of songs are set and the tempo changes in the middle of the playing of the motion picture image Q, the display mode of the character string W can be controlled so that it is scrolled and displayed in association with the tempo of the music.

Further, in addition to the display mode of the character string W explained above, for example, when the tempo b of the BGM is faster or slower than a predetermined threshold value, the music-obtaining unit 306*h* may make performance of the display of the character string W by adding predetermined actions such as blinking the display, enlarging and reducing the display, and displaying with swinging while scrolling and displaying the character string W. Accordingly, it is possible to vary the display mode of the character string W scrolled and displayed in such a manner to be overlaid on the motion picture image Q in the comment-attached motion picture image K and the display performance rich in taste can be achieved.

In the embodiment, in step S13 of the motion picture playing processing, the motion picture image Q composed of the plurality of frame images F1 to Fn is generated. Then, in step S16, the comment-attached frame images Fk1 to Fkn (comment-attached motion picture images K) made by overlaying the character string W on the motion picture image Q are successively generated, and are transmitted to the user terminal 2. However, the method for transmitting the comment-attached motion picture image K is merely an example, and is not limited thereto. It may be changed in any manner.

For example, when each frame image of the comment-attached motion picture image K is transmitted in step S16, the foreground frame images where a plurality of control points set in the subject-cropped image P1 are moved so as to follow the motion of a plurality of movable points of the motion information M are successively generated. At the same time, the frame images constituting the motion picture image Q are successively generated by successively combining the foreground frame images and the background image P2. Further, the comment-attached frame images in which the character string W is arranged on the frame image at the predetermined position in accordance with the scroll display speed S of the character string W may be successively generated, and may be transmitted to the user terminal 2.

Further, in the embodiment, a case where the character string W scrolled and displayed in the predetermined direction overlaid on the motion picture image Q is allowed to be input by the user on every occasion has been explained in detail, but this is merely an example and is not limited thereto. For example, predetermined character strings W (comment) that is set as a fixed phrase in advance or that can be set as necessary may be stored to, for example, a recording medium C or a storage unit 305, and a user desired character string W may be selectively used as necessary from among character strings set as default.

Further, in the embodiment, the motion picture image Q (comment-attached motion picture image K) overlaid with the user desired character string W is generated when the character string W is input by the user on every occasion, but this is merely an example and is not limited thereto. For example, the comment-attached motion picture image K may be generated in advance like the embodiment, and the generated comment-attached motion picture image K may be stored to, for example, the recording medium C and the storage unit 305. Then, the stored comment-attached motion picture images K may be read as necessary, thus enabling playing without relying on the predetermined communication network N.

When a motion picture image having a character string attached as Exif information is obtained by the motion picture-obtaining unit 306*d*, the motion picture playing control unit 306*g* may control playing of the motion picture image attached with the character string.

In the embodiment, the comment-attached motion picture image K or the motion picture image Q is generated by the server (motion picture playing apparatus) 3 functioning as a web server on the basis of predetermined operation performed by the user with the user terminal 2. However, this is merely an example, and is not limited thereto. The configuration of the motion picture playing apparatus may be changed as necessary. More specifically, the function of the motion picture processing unit 306 related to the generation of the motion picture image Q is installed to the user terminal 2 as a configuration for achieving the function with software. Accordingly, the motion picture playing processing explained above may be performed with the user terminal 2 alone without requiring the communication network N.

In the embodiment, a personal computer is shown as an example of the user terminal 2, but this is merely an example, and is not limited thereto. The user terminal 2 may be changed as necessary and, for example, cellular phones and the like may be applied.

Data of the cropped image of the subject G and the motion picture image Q may be embedded with predetermined control information for prohibiting the user for making changes.

In addition, in the embodiment, the functions of the motion picture image obtaining means, the character string obtaining means, and the control means are configured to be achieved by driving the motion picture-obtaining unit 306*d*, the comment-obtaining unit 306*e*, and the motion picture playing control unit 306*g* under the control of the central control unit 301. However, the embodiment is not limited thereto. Alternatively, it may be achieved when the CPU of the central control unit 301 executes predetermined programs and the like.

More specifically, a program including a motion picture image-obtaining processing routine, a character string-obtaining processing routine, and a control processing routine is stored to a program memory (not shown) for storing programs. Then, with the motion picture image-obtaining processing routine, the CPU of the central control unit 301 may function as motion picture image obtaining means for obtaining the motion picture image Q that can be reproduced at a predetermined playing time. With the character string-obtaining processing routine, the CPU of the central control unit 301 may function as character string obtaining means for obtaining the character string W scrolled and displayed in the predetermined direction overlaid on the motion picture image Q obtained by the motion picture image obtaining means. With the control processing routine, the CPU of the central control unit 301 may function as control means for controlling the display mode in which the character string W is scrolled and displayed on the basis of the playing time of the motion picture image Q obtained by the motion picture image obtaining means and the length of the character string W in the predetermined direction obtained by the character string obtaining means.

Further, a ROM, hard disk, a nonvolatile memory such as a flash memory, a portable recording medium such as a CD-ROM may be applied as a computer-readable medium storing the program with which each of the above processing is executed. The medium for providing the data of the program via a predetermined communication circuit includes a carrier wave.

The entire disclosure of Japanese Patent Application No. 2012-064053 filed on Mar. 21, 2012 including specification, claims, drawings and summary are incorporated herein by reference in its entirety.

What is claimed is:

1. A motion picture playing method for playing a motion picture image on a display unit, said method comprising:
   obtaining a first image;
   obtaining a second image;
   obtaining a motion picture image in which the second image serving as a background image is combined with the first image serving as a foreground image, wherein a position of the foreground image in the background image changes in the motion picture image over time;
   obtaining a character string to be scrolled and displayed in a predetermined direction overlaid on the motion picture image; and
   controlling a display mode for scrolling and displaying the character string based on (i) a length of the character string in the predetermined direction and (ii) a time required for changing the position of the foreground image in the motion picture image.

2. The motion picture playing method according to claim 1, further comprising identifying a scroll display region at the display unit where the character string is scrolled and displayed,
   wherein the display mode of the character string is controlled based on the identified scroll display region, in addition to the length of the character string in the predetermined direction and the time required for changing the position of the foreground image in the motion picture image.

3. The motion picture playing method according to claim 1, further comprising setting a display number which is a number of times the character string is to be scrolled and displayed,
   wherein the display mode of the character string is controlled based on the set display number in addition to the length of the character string in the predetermined direction and the time required for changing the position of the foreground image in the motion picture image.

4. The motion picture playing method according to claim 1, further comprising obtaining music to be played in association with playing of the motion picture image,
   wherein the display mode of the character string is controlled based on a tempo of the obtained music in addition to the length of the character string in the predetermined direction and the time required for changing the position of the foreground image in the motion picture image.

5. The motion picture playing method according to claim 4, wherein the controlling of the display mode of the character string comprises controlling a scroll display speed of the character string so that the scrolling and displaying of the character string is terminated when playing of the music is finished.

6. The motion picture playing method according to claim 1, wherein the controlling of the display mode of the character string comprises controlling a scroll display speed of the character string so that the scrolling and displaying of the character string is terminated when playing of the motion picture image is finished.

7. The motion picture playing method according to claim 1, wherein the motion picture image comprises a plurality of frame images obtained by combining a plurality of images.

8. The motion picture playing method according to claim 1, wherein, in the motion picture image, the foreground image itself is controlled to move.

9. The motion picture playing method according to claim 1, further comprising setting an arrangement of the character string in one of the foreground image and the background image,
   wherein the display mode of the character string is controlled based on the set arrangement of the character string in addition to the length of the character string in the predetermined direction and the time required for changing the position of the foreground image in the motion picture image.

10. A motion picture playing apparatus for playing a motion picture image on a display unit, said motion picture playing apparatus comprising:
    a first image obtaining unit for obtaining a first image;
    a second image obtaining unit for obtaining a second image;
    a motion picture image-obtaining unit for obtaining the motion picture image in which the second image serving as a background image is combined with the first image serving as a foreground image, wherein a position of the foreground image in the background image changes in the motion picture image over time;
    a character string-obtaining unit for obtaining a character string to be scrolled and displayed in a predetermined direction overlaid on the motion picture image; and
    a control unit for controlling a display mode for scrolling and displaying the character string based on (i) a length of the character string in the predetermined direction and (ii) a time required for changing the position of the foreground image in the motion picture image.

11. A non-transitory computer readable recording medium having stored thereon a program for controlling a computer of a motion picture playing apparatus for playing a motion picture image on a display unit to function as:
    a first image obtaining unit for obtaining a first image;
    a second image obtaining unit for obtaining a second image;
    a motion picture image-obtaining unit for obtaining the motion picture image in which the second image serving as a background image is combined with the first image serving as a foreground image, wherein a position of the foreground image in the background image changes in the motion picture image over time;
    a character string-obtaining unit for obtaining a character string to be scrolled and displayed in a predetermined direction overlaid on the motion picture image; and
    a control unit for controlling a display mode for scrolling and displaying the character string based on (i) a length of the character string in the predetermined direction and (ii) a time required for changing the position of the foreground image in the motion picture image.

* * * * *